(12) United States Patent
Pedersen et al.

(10) Patent No.: US 11,331,581 B2
(45) Date of Patent: May 17, 2022

(54) EXPERIENCE BASED GAME DEVELOPMENT AND METHODS FOR USE THEREWITH

(71) Applicant: modl.ai ApS, Copenhagen K (DK)

(72) Inventors: Christoffer Holmgård Pedersen, Copenhagen K (DK); Benedikte Mikkelsen, Copenhagen K (DK); Julian Togelius, New York City, NY (US); Georgios N. Yannakakis, Sliema (MT); Sebastian Risi, Copenhagen S (DK); Lars Henriksen, Brønshøj (DK)

(73) Assignee: modl.ai ApS, Copenhagen K (DK)

( * ) Notice: Subject to any disclaimer, the term of this patent is extended or adjusted under 35 U.S.C. 154(b) by 0 days.

(21) Appl. No.: 17/146,751

(22) Filed: Jan. 12, 2021

(65) Prior Publication Data

US 2021/0146258 A1   May 20, 2021

Related U.S. Application Data

(63) Continuation-in-part of application No. 16/821,020, filed on Mar. 17, 2020, now Pat. No. 10,918,948, and
(Continued)

(51) Int. Cl.
*A63F 13/69*   (2014.01)

(52) U.S. Cl.
CPC .................................. *A63F 13/69* (2014.09)

(58) Field of Classification Search
None
See application file for complete search history.

(56) References Cited

U.S. PATENT DOCUMENTS 7,636,701 B2   12/2009   Funge et al.
8,047,915 B2   11/2011   Lyle
(Continued)

OTHER PUBLICATIONS

Hudlicka, Eva; Affective Game Engines: Motivation and Requirements; Proceedings of the 4th International Conference on Foundations of Digital Games; Apr. 26-30, 2009; 10 pgs.
(Continued)

*Primary Examiner* — Jason T Yen
(74) *Attorney, Agent, or Firm* — Garlick & Markison; Bruce E. Stuckman

(57) ABSTRACT

A game development platform operates by: updating a gaming application based on a play of the game by a non-imitating game bot to generate a first updated gaming application corresponding to a first updated game; generating an imitating game bot based on first game telemetry data generated in response to a play of the first updated game by a first plurality of actual players; generating behavioral experience analysis (BEA) data based on the play of the first updated game by the first plurality of actual players; generating a BEA tool based on the BEA data; updating the first updated gaming application based on play of the first updated game by the imitating game bot to generate a second updated gaming application corresponding to a second updated game; generating predicted player motivations via the BEA tool based on second game telemetry data generated in response to a play of the second updated game by a second plurality of actual players; and updating the second updated gaming application based on the predicted player motivations to generate a third updated gaming application corresponding to a third updated game.

20 Claims, 15 Drawing Sheets
(5 of 15 Drawing Sheet(s) Filed in Color)

Related U.S. Application Data a continuation-in-part of application No. 16/820,146, filed on Mar. 16, 2020.

(60) Provisional application No. 62/820,412, filed on Mar. 19, 2019, provisional application No. 62/820,417, filed on Mar. 19, 2019, provisional application No. 62/946,019, filed on Dec. 10, 2019, provisional application No. 62/820,424, filed on Mar. 19, 2019, provisional application No. 62/946,824, filed on Dec. 11, 2019, provisional application No. 62/966,669, filed on Jan. 28, 2020, provisional application No. 62/967,845, filed on Jan. 30, 2020.

(56) References Cited

U.S. PATENT DOCUMENTS

| | | |
|---|---|---|
| 9,579,576 B2 | 2/2017 | Cao |
| 10,361,975 B2 | 7/2019 | Borsutksy |
| 10,491,548 B2 | 11/2019 | Xie |
| 10,511,450 B2 | 12/2019 | Fung |
| 10,888,788 B2 | 1/2021 | Osman |
| 2014/0152461 A1 | 6/2014 | Carlson et al. |
| 2017/0136362 A1* | 5/2017 | Bucher .................... A63F 13/79 |
| 2018/0015370 A1* | 1/2018 | Sorek ...................... A63F 13/00 |
| 2018/0083894 A1 | 3/2018 | Fung |
| 2018/0109526 A1 | 4/2018 | Fung |
| 2018/0243656 A1* | 8/2018 | Aghdaie .................. A63F 13/79 |
| 2019/0060759 A1 | 2/2019 | Krishnamurthy |
| 2020/0151087 A1* | 5/2020 | Cappello ............. G06F 11/3648 |
| 2020/0306638 A1* | 10/2020 | Fear ........................ A63F 13/67 |

OTHER PUBLICATIONS

International Searching Authority; International Search Report and Written Opinion; Int'l Application No. PCT/US2020/023290; dated Jul. 13, 2020; 13 pgs.

Makantasis, "From Pixels to Affect: A Study on Games and Player Experience", 2019 8th International Conference on Affective Computing and Intelligent Interaction (ACII) 7 pages, Oct. 15, 2019.

Melhart, "Your Gameplay Says it All: Modelling Motivation in Tom Clancy's The Division", 11 pages, Jan. 31, 2019.

Snodgrass, "Markow Models for Procedural Content Generation", A Thesis Submitted to the Faculty of Drexel University, Mar. 2018, 233 pages.

\* cited by examiner

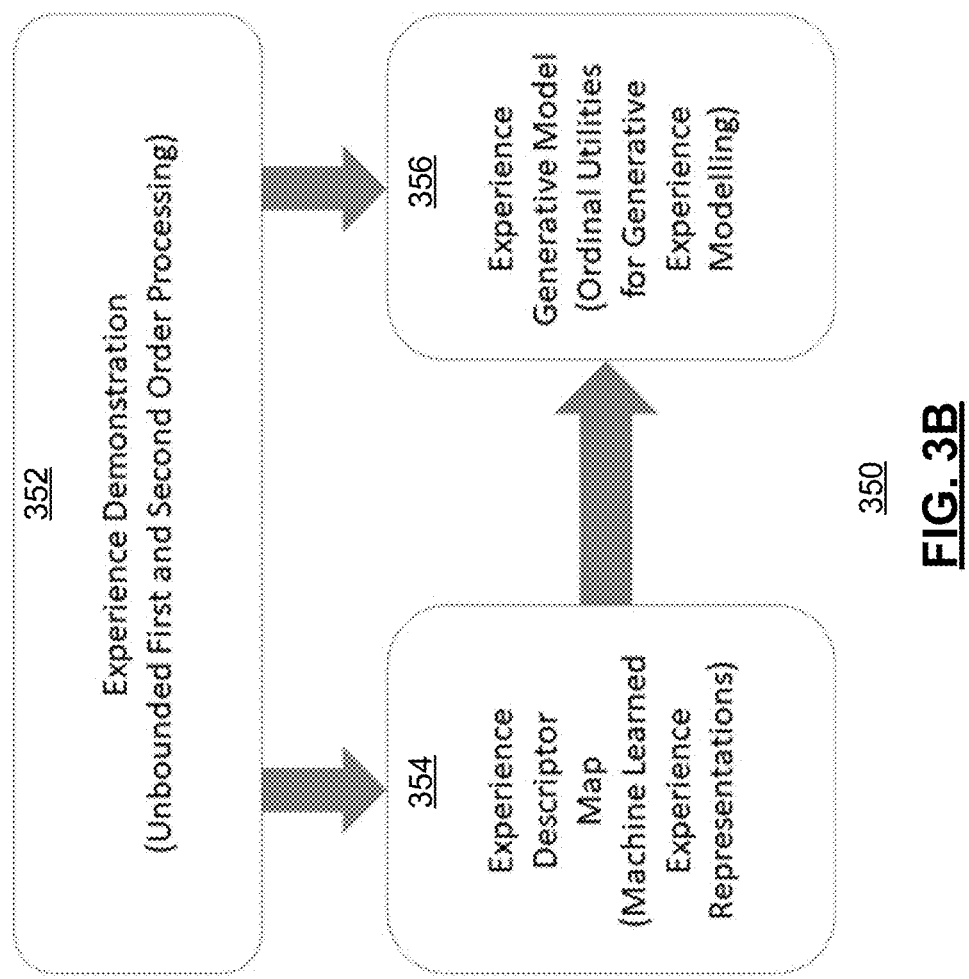

EXPERIENCE BASED GAME DEVELOPMENT AND METHODS FOR USE THEREWITH

CROSS REFERENCE TO RELATED PATENTS

The present U.S. Utility patent application claims priority pursuant to 35 U.S.C. § 120 as a continuation-in-part of U.S. Utility application Ser. No. 16/821,020, entitled "GAME BOT GENERATION FOR GAMING APPLICATIONS", filed Mar. 17, 2020, which claims priority pursuant to 35 U.S.C. § 119(e) to U.S. Provisional Application No. 62/820,412, entitled "OVERALL PIPELINE FOR EXPERIENCE DRIVEN AUTOMATIC GAME TESTING AND PROCEDURAL CONTENT GENERATION WITH PROCEDURAL PERSONAS", filed Mar. 19, 2019; U.S. Provisional Application No. 62/820,417, entitled "BEHAVIOR AND EXPERIENCE MODELING WITH PREFERENCE LEARNING", filed Mar. 19, 2019; U.S. Provisional Application No. 62/946,019, entitled "BEHAVIOR AND EXPERIENCE MODELING WITH PREFERENCE LEARNING", filed Dec. 10, 2019; U.S. Provisional Application No. 62/820,424, entitled "FLEXIBLE PLAY TRACE REPLAY FOR REGRESSION TESTING OF GAME CONTENT", filed Mar. 19, 2019; U.S. Provisional Application No. 62/946,824, entitled "PIXEL-BASED EXPERIENCE MODELING FOR GAMING APPLICATIONS", filed Dec. 11, 2019; U.S. Provisional Application No. 62/966,669, entitled "VIEWER EXPERIENCE MODELING FOR GAMING APPLICATIONS", filed Jan. 28, 2020; and U.S. Provisional Application No. 62/967,845, entitled "MULTIMODAL EXPERIENCE MODELING FOR GAMING APPLICATIONS", filed Jan. 30, 2020, all of which are hereby incorporated herein by reference in their entirety and made part of the present U.S. Utility patent application for all purposes.

The present U.S. Utility patent application also claims priority pursuant to 35 U.S.C. § 120 as a continuation-in-part of U.S. Utility application Ser. No. 16/820,146, entitled "USER EXPERIENCE MODELING FOR GAMING APPLICATIONS", filed Mar. 16, 2020, which claims priority pursuant to 35 U.S.C. § 119(e) to U.S. Provisional Application No. 62/820,417, entitled "BEHAVIOR AND EXPERIENCE MODELING WITH PREFERENCE LEARNING", filed Mar. 19, 2019; U.S. Provisional Application No. 62/946,019, entitled "BEHAVIOR AND EXPERIENCE MODELING WITH PREFERENCE LEARNING", filed Dec. 10, 2019; and U.S. Provisional Application No. 62/946,824, entitled "PIXEL-BASED EXPERIENCE MODELING FOR GAMING APPLICATIONS", filed Dec. 11, 2019, all of which are hereby incorporated herein by reference in their entirety and made part of the present U.S. Utility patent application for all purposes.

TECHNICAL FIELD

The present disclosure relates to processing systems and applications used in the development of gaming applications used by gaming systems and other gaming devices.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 3B presents a flow/block diagram representation of a components of the general experience personas in accordance with an embodiment of the present disclosure.

DETAILED DESCRIPTION

Figure 1:
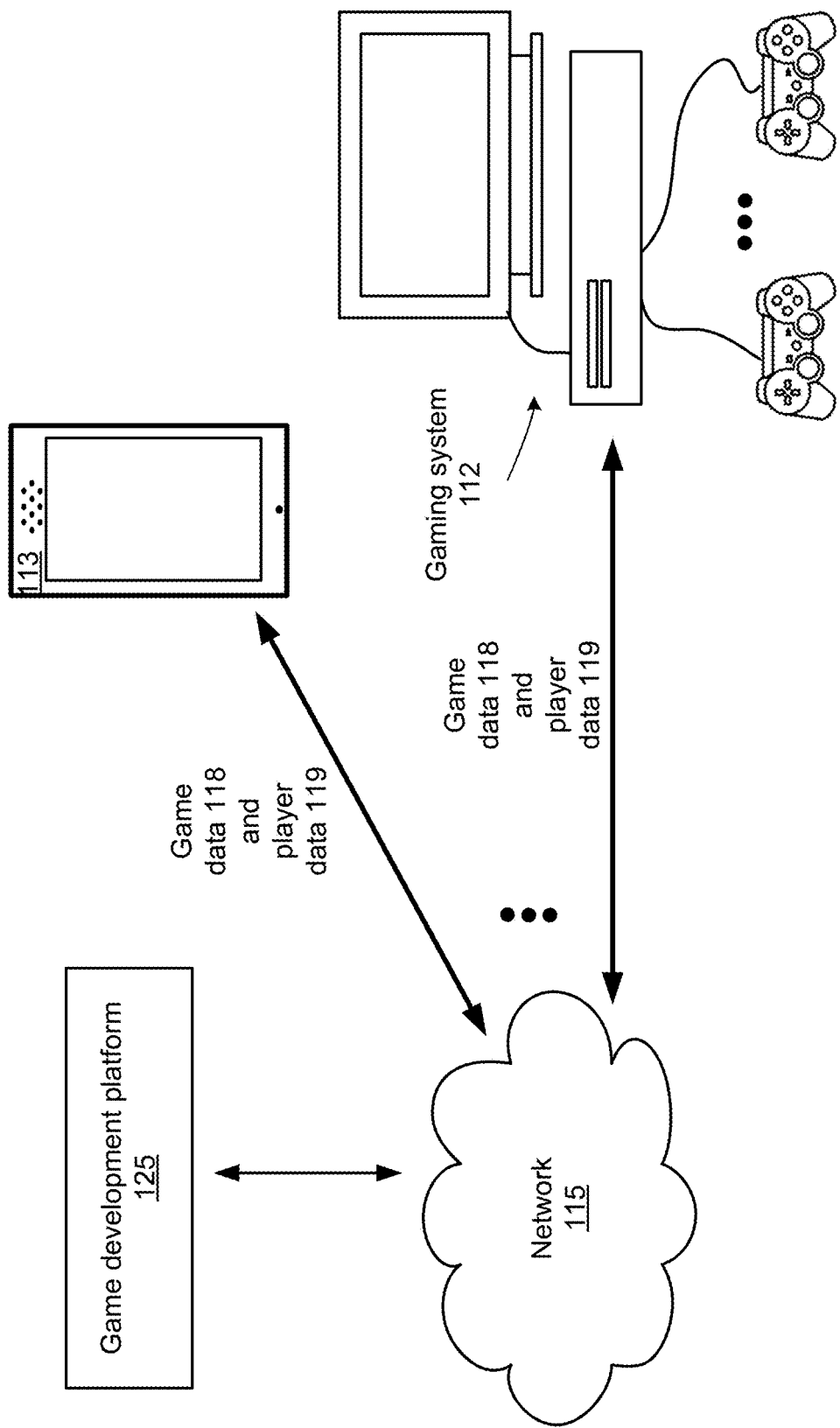
FIG. 1 presents a pictorial/block diagram representation of a game development system in accordance with an embodiment of the present disclosure.

FIG. 1 presents a pictorial/block diagram representation of a game development system in accordance with an embodiment of the present disclosure. In particular, a game development platform 125 is presented that communicates game data 118 and player data 119 via network 115 with gaming devices such as mobile device 113 and gaming system 112 via network 115. The network 115 can be the Internet or other wide area or local area network. The game development system 125 can be used in the creation, development, testing, balancing and updating of a gaming application.

The game data 118 can include, for example, a current version of a gaming application that is presented to the gaming devices for play. Furthermore, the game data 118 sent from the gaming devices to the game development platform 125 can include game telemetry data or be processed to produce game telemetry data and/or other game analytics used in game development. The player data 119 can include one or more modes of output such as player or viewer verbal data generated by a microphone associated with the gaming system 112 or 113, chat data associated with a player or viewer and/or non-verbal data of a player or viewer such as facial expression, head pose, and/or other non-verbal data that is captured via a camera or other imaging sensor associated with the gaming system 112 or 113 that indicates, for example, player and/or viewer engagement, reactions or emotions.

The operation of the game development platform 125 will be described in greater detail in conjunction with FIGS. 2-14, including several optional functions and features and examples thereof. In particular, improvements to both the technology of game application development and the technology of gaming applications themselves are presented herein.

Figure 2:
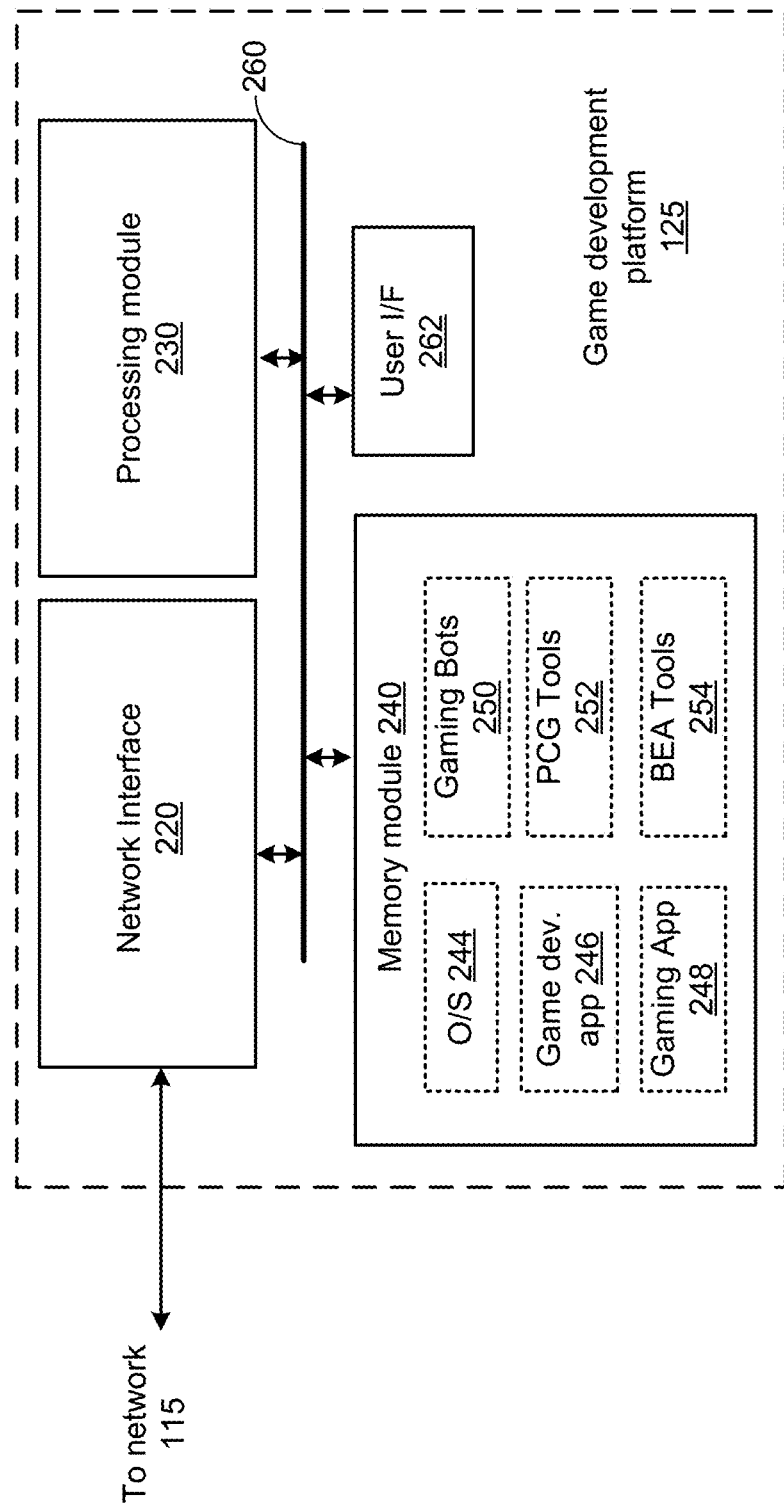
FIG. 2 presents a block diagram representation of a game development platform in accordance with an embodiment of the present disclosure.

FIG. 2 presents a block diagram representation of a game development platform in accordance with an embodiment of the present disclosure. In particular, the game development platform 125 includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating with one or more gaming devices via network 115. The network 115 can be the Internet or other public or private network.

The game development platform 125 also includes a processing module 230 and memory module 240 that stores an operating system (O/S) 244 such as an Apple, Unix, Linux or Microsoft operating system or other operating system, a game development application 246, one or more gaming applications 248, one or more gaming bots 250, one or more procedural content generation (PCG) tools 252, and one or more behavioral experience analysis (BEA) tools 254. In particular, the O/S 244, game development application 246, gaming application 248, gaming bots 250, PCG tools 252 and BEA tools 254 each include operational instructions that, when executed by the processing module 230, cooperate to configure the processing module into a special purpose device to perform the particular functions described herein.

The game development platform 125 can also include a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the game development platform 125 and that generate data in response to the user's interaction with the game development platform 125.

The processing module 230 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 240.

The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the game development platform 125 can include one or more additional elements that are not specifically shown.

The game development application 246 can be used by a game developer to aid and facilitate the creation, development, testing, balancing, improving, revision, optimizing adaptation and/or updating of the gaming application 248. The gaming application 248 can be, for example, a multi-player or single player game including a shooter or other combat game, fantasy game or other action or adventure game, a simulation game that simulates the operation of a real-world vehicle device or system, a realtime strategy game, a puzzle, a sports game, role-playing game, board game or other video or digitally animated game. In various embodiments, one or more versions of the gaming application 248 can be stored including, for example, multiple versions or updates of the gaming application, one or more sets of game parameters, game profiles or game options, one or more levels and other content and/or other gaming data.

The gaming bots 250 operate in conjunction with the game development application 246 to test the operation of the gaming application 246 and/or to operate as one or more non-player characters (NPCs) in the game. The gaming bots 250 can include and/or operate as game playing AI (artificial intelligence) personas that are constructed and implemented via a machine learning algorithm and that operate, for example, as automatic testers designed to represent specific play-styles or skill levels. These AI personas can be used, for example, to progress through a game much faster than an actual player to evaluate game content more quickly; to assess the difficulty of levels with randomness with thousand variations of playthroughs; to generate key performance indicators (KPIs), to increase the speed of design iteration, to free up designers' time to focus on gameplay and high level concepts; to test with the same skill level and style again and again, for example, through various versions an/or iterations of a gaming application 248. The use of artificial, rather than human intelligence, allows the gaming bots 250 to perform with a speed and consistency that cannot practically be performed in the human mind.

Furthermore, one or more of the AI personas can operate as regression play-testers that play games based on machine learning on recorded human demonstrations and check that the game is still playable after content or code changes. In particular, the regression play-testers can generate a report when errors are found in the game, generate KPIs, predict changes to overall play time and game difficulty and/or operate in conjunction with BEA tools 250 to predict changes to the amount of player behavioral motivation, both positive and negative, including boredom, excitement, completion, etc.

As indicated above, the AI personas can work as player stand-ins, AI opponents, and/or NPCs for single and multi-player games. This allows a game developer to make sure there is always someone to play against and to imitate actual opponents, before and after launch; challenge players with opponents that vary in skill level and style; and generate a living, convincing world with characters that vary in behavioral patterns.

The PCG tools 252 use procedural content generation to kick-start and accelerate the creative processes of the game developer in the use of the game development application 246 in the development of new gaming applications 248 and/or new content or levels to existing gaming applications. The PCG tools 252 are constructed via constructive algorithm, generate-and-test algorithm, search-based algorithm, and/or a machine learning algorithm and include, for example, a convolutional neural network, stacking neural networks, a generative adversarial network, or other deep learning algorithm that is iteratively trained based on game telemetry data, behavioral motivation data and/or game play by one or more AI personas and operates to generate new game content such as new game variations, new levels, and other content.

For example, game playing AI personas can evaluate and critique content generated via PCG by generating AI persona play-traces and statistics across game content and evaluate procedurally generated content in terms of predicted KPIs and/or other performance metrics. This allows the game development application 246 to automatically and quickly assist the game developer in understanding and evaluating the play-space of a PCG enabled game, to protect a PCG design from unplayable or degenerate examples.

Furthermore, the PCG tools 252 can generate new puzzles, levels or other content by learning from examples provided by the game developer to the game development platform 125 to seed the deep learning algorithm and generate new candidate content for evaluation. This allows game developers using the game development platform 125 to increase their productivity with pre-generated puzzles, levels and/or other content; to focus on concepts and important details rather than mundane layouts; to start creating from generated examples instead of a blank canvas, and/or generate content in the style and preferences learned from prior game developer based on the seed examples provided by the game developer to the game development platform 125.

The BEA tools 254 operate in conjunction with the game development application 246 to automatically predict player motivations and other player/viewers experiences from game telemetry data or other play traces of players/viewers in realtime and to generate behavioral motivation data (referred to also as "motivation data", predicted "player/user motivation" or predicted "user motivation") that, for example includes a score or other value that indicates an amount for each of a plurality of motivation factors or other indicators of player/viewer motivation that indicates the predictions as to player/viewer motivation or other player/viewer experience. Furthermore, the use of BEA tools 254 in combination with gaming bots 250 and/or PCG tools 252 allows a game developer to predict, based on simulated game play, future player/viewer motivations and other player experiences from play traces of AI personas.

This use of the game development platform 125 can assist the game developer in understanding why players or viewers like a particular gaming application 248, and adapt the gaming application to reduce churn, optimize player experiences and long-term engagement. In particular, potential game players are different and play for different reasons. Predicting player motivations helps the game developer to understand these differences and groupings across a potential player base.

The BEA tools 254 can be constructed via preference learning or other machine learning techniques that are trained, for example, based on player questionnaires, game telemetry data or other game data in order to learn and predict actual player motivations. Once trained, the BEA tools 254 use game telemetry data from other players/viewers to predict individual players'/viewers' reasons for interacting with a game. For example, generating BEA data in the form of motivation data that indicates to which degree or amount that players/viewers are motivated by a plurality of motivation factors allows a game developer to optimize the player experience accordingly, to match players according to their motivations, creating better play sessions, to optimize and individualize games to a player, retaining players/viewers and improving life-time value, to identify poor player matches (i.e. player mismatches) and potential negative interactions before they become a problem, to track developments in a game's player base over time and manage a gaming application by tracking, day-by-day, if the typical player motivation or behavioral profile starts changing.

Consider the following case examples.

Case #1

BACKGROUND

A game developer is using the game development platform 125 to develop gaming application 248 that is a multiplayer mobile game.

The game features two opposing teams, each with up to four characters, playing a form of fantasy American football.

The characters that a player can use are taken from a larger pool, available to the player, and built into a "deck" for specific matches.

Each of the characters have different abilities that radically alter the player experience. Combining different characters in different decks will give players different teams.

Additionally each character can be tuned indefinitely in terms of combinations of health values, damage, speed, etc.

It is important to understand how these different decks play against each other, to ensure that the game is well balanced and that players are incentivized to acquire more characters as they play the game.

The game developer plans to continuously develop new characters and release new ones periodically, following the initial launch.

Additionally, the game developer plans to develop and release new playing fields, that change the properties of the gameplay, again impacting the play value of a particular deck.

Needs

The game developer needs to understand the play properties of each of the characters, both alone and when combined with other characters in a deck.

This means the game developer needs to understand that different characters perform dynamically against each other in the game during gameplay.

This means playing many games with different character deck configurations and observing and analyzing the impact of various play styles and strategies with various combinations.

The game features 18 characters and in addition to choosing four characters, players can choose between 4 spells they can add to their deck.

This means that the current version of the game supports 293,760 different deck combinations where the properties of the characters and spells could vary indefinitely.

As each match is played with two decks (which could be the same) there are 86,294,937,600 different matches that can be setup and played before tuning any game values.

In addition to this, different game maps further increase the complexity.

This combinatorial problem with continue to expand as more characters and maps are added to the game.

The game developer wants to explore the properties of as many different deck solutions and match combinations as possible to optimize the gameplay and ensure a product with high retention that monetizes well, in order to maximize customer lifetime value (LTV).

Use of the Game Development Platform 125

Playing a single match to investigate the properties of a character and a deck currently takes about 5 minutes for two people each who need to coordinate in order to be able to play at the same time.

Playing a single match to investigate the properties of a character and a deck currently takes 20-25 seconds for two gaming bots 250.

In addition to being 15 times faster than using human players, the gaming bots 250 allow many matches to be executed in parallel, the data aggregated, and compared using statistics, rather requiring qualitative interpretation.

Game developers who wish to qualitatively inspect a character can do so playing against gaming bots 250, reducing the human labor involved by 50% and freeing employee time for other tasks, while removing the need for scheduling between two employees.

Additionally, gaming bots 250 can be included in the finished game as NPCs to face the player. This removes the need for the game developer to separately develop a player facing AI internally, and improves the game's hard launch by providing an unlimited number of opponents for new players, as the game developer is building their player base.

Case #2

Background

The game developer has an existing gaming application 248 that implements a puzzle game.

Keeping the game fresh to players requires continuous production of new content.

The new content needs to be of high quality.

Content is not interchangeable: The game developer reports from analytics that differences in level quality has a major impact on customer lifetime value—good levels are the key component to retaining players.

The current team for creating new levels consists of 2-3 level designers creating new levels.

Previously the designers could produce 15 new levels released into the game every two weeks. Evaluating these levels with an external playtest company took 1 week.

Reducing iteration time allows designers to focus on new features that increase the quality of the levels which is the main predictor of the game's performance.

Needs

The game developer would like algorithms for automatically generating new level concepts, for designers to choose from, to allow designers to focus on novel level ideas rather than the mundane aspects of constructing level designs.

The game developer would like to use automatic content generation to spark new ideas with designers—addressing "the blank canvas problem"—i.e. starting on ideas from scratch.

The game developer would like bots that play more like humans, in order to improve their evaluation of designer-created levels.

Use of the Game Development Platform 125

With automated playtesting by one single gaming bot 250, this rate can be increased to 30 finished levels every 1 week. Evaluating levels is almost instant, allowing designers to iterate while their ideas are fresh.

Case #3

Background

The game developer is developing a gaming application 248 that implements a multiplatform narrative game for PC, Mac and PlayStation 4.

The game is a highly complex branching narrative, consisting of around 8 hours worth of gameplay for a full playthrough.

Needs

The elements of the game are highly interdependent.

Changing an early part of the story may have repercussions in later parts of the story and make the game impossible to complete.

Changing code to address needs identified later in development or to fix bugs can break functionality in earlier parts of the game.

The team size is limited and does not have a full time Quality Assurance person on the team.

When bugs are encountered by non-programmer team members, their work often stops as a consequence, due to not being able to test the game or experience the content as they are creating it.

This breaks creative flow and significantly increases the time to iterate on story ideas.

Asking programmers for urgent bug-fixes tends to break programmers' work-flow, thus having knock-on cost effects.

Testing the full game in response to changes takes at least 8 hours of full time work, plus logging, case creation, and derived tasks.

The game developer needs a solution to automatically identify failure points in traversing the story content of the game.

Use of the Game Development Platform 125

Gaming bots 250 automatically walk through the story of the game, allowing the game developer to identify when the game would crash or the player would get stuck.

The system operates in two fashions:
1. Through player imitation, gaming bots 250 simulate previous player action to validate that previous demonstrations still are possible following changes to game code or content.
2. Gaming bots 250 automatically search through be game, walking through the story lines, looking for crash situations and or dead ends.

This implementation of the game development platform 125 has three benefits:
1. The game development platform 125 can continuously verify that the game works following changes.
2. The game development platform 125 can continuously verify that the game is completable.
3. The game development platform 125 can indefinitely play the game, enabling stress testing that simulates human interactions and provides more realistic use case than simply letting the game run with no input. The game development platform 125 roughly replaces the effort of one QA employee.

For a team of approximately 10 individuals, this corresponds to roughly 7% savings in terms of budget following initial implementation.

Additionally, the game development platform 125 provides improvements in creative efficiency, leading to higher quality content, which can positively impact the final game performance.

Case #4

Background

A game developer has implemented an infinite runner game.

Needs

It is difficult to know the players when the player base is very large.

Only about 5% of the player complete a game.

The game designer's goal is to have most players complete a game.

Use of the Game Development Platform 125

The use of BEA tools 254 can determine realtime player experience including player motivation that is used to adapt the game to help improve game completion and player retention.

Figure 3A:
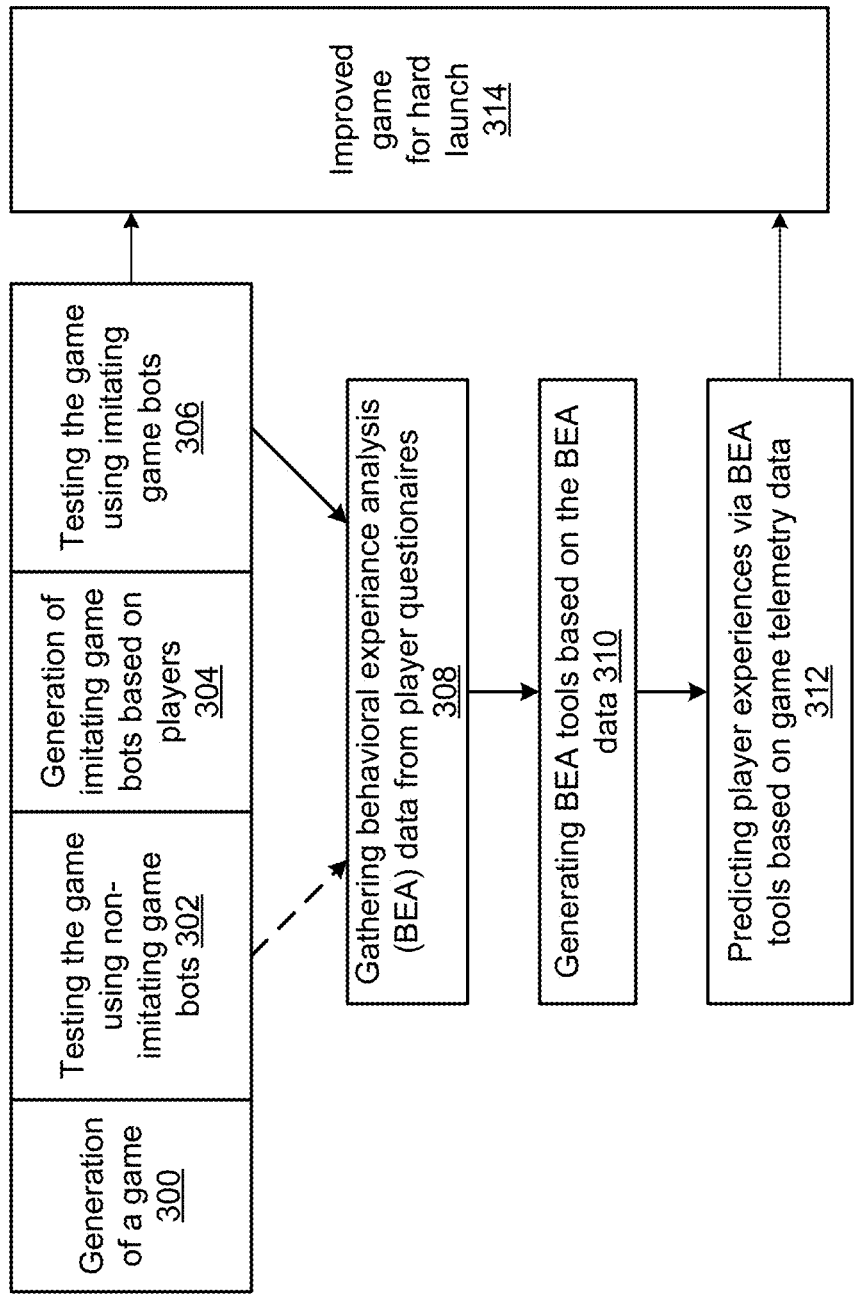
FIG. 3A presents a flow/block diagram representation of a game development pipeline in accordance with an embodiment of the present disclosure.

FIG. 3A presents a flow/block diagram representation of a game development pipeline 325 in accordance with an embodiment of the present disclosure. This game development pipeline 325 operates in conjunction with the game development platform 125 of FIGS. 1 and 2 and uses one or more of the functions and features described therewith. In particular, a game development pipeline is presented where game development progresses temporally from the initial generation of a game in step 300 through, for example, alpha testing, beta testing and/or soft launch and leading to the generation of an improved game for hard launch in step 314.

In step 300, a game, such as an initial version of a gaming application 248 is generated. In various embodiments, the initial version of the game is developed by the game developer using the game development application 246, either from scratch or from initial game content generated by PCG tools 252 based on, for example, prior games or prior versions of the game developed by the game developer or other user.

In step 302, the game is tested using gaming bots 250 that are non-imitating, e.g. that are developed and trained from testing and evaluation of prior games or prior versions of the game developed by the game developer. In various embodiments, the gaming bots 250 include a library of non-imitating gaming bots along with descriptive metadata that indicates, for example, the source, prior use, player style, skill level, corresponding player motivations and/or other characteristics of each gaming bot. The game developer can select and evaluate one or more existing gaming bots that are used for this testing. Once one or more of the gaming bots 250 is selected, the game can be tested and improved to, for example, identify dead-ends, and begin to balance the game, increase playability, etc.

In step 304, imitating gaming bots 250 are generated based on game telemetry data from actual players, such as internal or external players used in testing prior to hard launch. In various embodiments game telemetry data can include data gathered from play traces that can include, for example, game audio and video output including pixel data and audio data, player input, game status, game events, game achievements, progress toward game goals, game parameters, KPIs, game completion data, gameplay data, game progression data, player styles derived from any of the foregoing and other game telemetry data and game analytics.

In various embodiments, the gaming bots 250 operate via a machine learning algorithm that is trained via the game telemetry data and or other data from actual players/viewers. Examples of such machine learning algorithms include artificial neural networks (or more simply "neural networks" as used herein), support vector machines (SVMs), Bayesian networks, genetic algorithms and/or other machine learning techniques that are trained via unsupervised, semi-supervised, supervised and/or reinforcement learning and can further include feature learning, sparse dictionary learning, anomaly detection, decision trees, association rules and/or other processes.

In step 306, the game is further tested and improved by monitoring output, such as game telemetry data including, for example, KPIs and other game analytics generated by play of the game by the gaming bots 250. In this fashion, various versions of the game can be automatically tested, evaluated and improved to, for example, identify dead-ends, further balance the game, further increase playability, optimize predicted player retention, engagement, motivations and other experience, etc.

In step 308, BEA data is gathered from player questionnaires or other experience metrics that includes various player motivation factors that can be, for example, correlated to KPIs, game events, player behaviors, game status, game achievements, progress toward game goals, game parameters, and other game analytics. Player motivation factors can be broad motivation factors such as competence, autonomy, relatedness, and presence. In addition or in the alternative, player motivation factors and/or behaviors can be game-related, including competition, completion, fantasy, destruction, discovery, strategy, excitement, power, including more specific motivations such as achieving a high score, being constantly challenged, being challenged with some other frequency, reaching game goals and achievements, completing levels, relaxing, exploring, avoiding boredom, beating other players or spoiling other players games, cheating, avoiding other players that cheat, spoiling other players that cheat, and other play styles, etc.

In step 310, the BEA data is used to train one or more BEA tools. As previously discussed, the BEA tools 254 can be constructed via preference learning or other ordinal machine learning techniques that are trained based on the BEA data and/or game telemetry data in order to learn and predict actual player motivations.

In step 312, player experiences such as player motivation or other experiences can be predicted via the BEA tools based on game telemetry data from actual players and/or imitating or non-imitating gaming bots 250, automatically and in realtime. This player experience data can be used in conjunction with gaming bot testing in step 306 to further improve the game in step 314 for hard launch, for example, by improving game performance, predicted player satisfaction with a game, increasing predicted player retention, and/or increasing predicted revenue generation.

While the game development pipeline 325 has been described that corresponds to the adaptation, testing, analysis and refinement of an initial version of the game to an improved game for hard launch, one or more steps in the game development pipeline 325 can also be used to similarly process new versions, updates and/or new content additions to a gaming application 248. Furthermore, while the game development pipeline 325 has been described as including step 308 of gathering BEA data and step 310 of generating BEA tools 254 based on the BEA data, in circumstances where the game development platform 125 is used to process similar games, new versions, updates and/or new content additions to a gaming application 248, one or more BEA tools 254 generated from prior versions of the game or from similar games can be selected to for reuse. For example, the BEA tools 254 include a library of BEA tools along with descriptive metadata that indicates, for example, the source, prior use, and/or other characteristics of each BEA tool. The game developer can select and evaluate one or more existing BEA tools 254 that are used in step 312 to predict player experiences including motivations and/or behaviors and other experiences based on game telemetry data from external players.

In addition, consider the following further example for obtaining computational models of player experience that are generative and general (e.g. "general experience personas"). The personas are generative as they are able to simulate the experience of players which is provided as human experience demonstrations. This process is also general across the various instantiations of a particular domain that involves the digitization and simulation of human experience.

To obtain general experience personas, game development platform 125 can fuse innovations on three aspects of a computational model: the input of the model, the computation, and the output of the model. This approach can build on anchoring methods of psychology according to which humans encode values in a comparative (relative) fashion. Based on an innovative ordinal modeling approach, personas perceive humans (or their demonstrations) via generalizable features and they gradually machine learn to experience the environment as humans would do.

The game development platform 125 improves the technology of game development in many ways. The game development platform 125 solves a fundamental problem of psychometrics and human psychology at large: to measure experience computationally in a reliable and valid way. It also addresses a core question of human computer interaction and player experience research: how to simulate experience in simulated worlds the same way humans would feel it. Finally, it solves a traditional problem at the intersection of machine learning and affective computing: how to learn the most out of less data of a subjective nature to improve the speed of generating an AI model, reduce its complexity and furthermore to improve its accuracy.

FIG. 3B presents a flow/block diagram 350 representation of a components of the general experience personas in accordance with an embodiment of the present disclosure. In particular, a method is presented for use with any of the functions and features described in conjunction with FIGS. 1, 2 and 3A. This process offers a reliable and effective solution to the generative modelling of player experience (including, for example, motivations and/or behaviors) by combining innovations across the three core subprocesses: the input (descriptor map), the computation per se (generative model), and the output (demonstration).

Step 352—Experience Demonstration: the proposed approach for processing the output of the persona is general as it may support any annotation type from traditional psychometrics. It can differ from prior approached, for example, in the way experience labels are collected and processed. In particular, human demonstrations of experience can be collected in a continuous fashion via engagement metrics that are extracted from an interaction. That includes the spectrum all the way from the passive observation of a video (e.g. a gameplay video) by a viewer to the active annotation of any interaction (e.g. a game). Experience labels are processed in an ordinal and unbounded fashion thereby allowing the construction of value-agnostic and general experience models. By following first-order and second-order combinatorial techniques yields both valid and reliable human demonstrations of experience but also generates large datasets from limited data. Questionnaires of any type—the dominant state of practice within human computer interaction—are no longer needed (even though questionnaire data can still be processed) and human participation is only limited to realistic small-scale player group sizes.

Step 354—Experience Generative Model: experience personas can either learn to predict the experience of a human or even express the experience as a human would do. For the former, the game development platform involves methods of deep (preference) learning that learn to predict the global or partial order of labelled experience. For the latter, the order of human demonstrations (as from above) defines the utility a reinforcement learning approach (e.g. neuro-evolution) will learn to infer. The result is a generative model of experience that is able to "feel" in the simulated environment as a human player would do.

Step 356—Experience Descriptor Maps: experience is perceived in the ways interaction is performed and bounded by the experience labelling. The model of perception focuses on areas of labelled experience that are meaningful for the model and eliminates areas that no change is observed or reported with regards to experience. The representation of experience is learned by observing generic aspects of interaction, namely general experience descriptor maps. The design of the maps may vary from high level behavior characterizations to sequential patterns of interaction to detailed latent variables that map to labels of experience. The latter are constructed through simulations of interactions directly when that is possible or indirectly through machine learned forward models of interactions when access to the code that generates the interaction is not available.

In addition to mere game development, the BEA tools 254 of the game development platform 125 can be incorporated into the final game itself. In this fashion, individual players can be assessed in terms of their motivations and/or behaviors. In various embodiments, a particular game version or game parameter setting can be selected from a library of possible game versions/settings for an individual player in order to complement or otherwise match the particular motivations and/or behaviors predicted to correspond with the individual player in order to, for example, improve the experience for a particular player. In this fashion, a player who likes challenges can be challenged, a player who likes completion can be given a game that is easier to complete, etc.

Furthermore, the BEA tools 254 of the game development platform 125 can be employed to pair players together in a multiplayer game based on their respective motivations and/or behaviors. For example, a valuable player who, based on a determination by the BEA tools, likes to play the spoiler can be retained by routinely pairing him or her with less-experienced players to foil. In another example, a player, determined to cheat by the BEA tools can be paired with other such players or players who are cheat neutral, avoiding other players who are determined to be demotivated by opposing players who cheat, etc.

While described above in the conjunction with generating BEA data for games, the techniques described above can apply in other industries as well. Being able to both model and generate the experience of people can be used in any research domain or industrials sector involving human behavior and experience. The list of potential applications of the process is vast and includes sectors such as creative industries, marketing, retailing, web services, architecture and built environment, cyber physical systems, automobile industry, and the digital arts. Generative and general experience personas not only leverage the ability to test, develop and offer services faster and more efficiently. They also enable better (persona-driven) decisions all the way from ideation to prototyping, production, and release of a service, a project or an object that humans would interact with.

Figure 4:
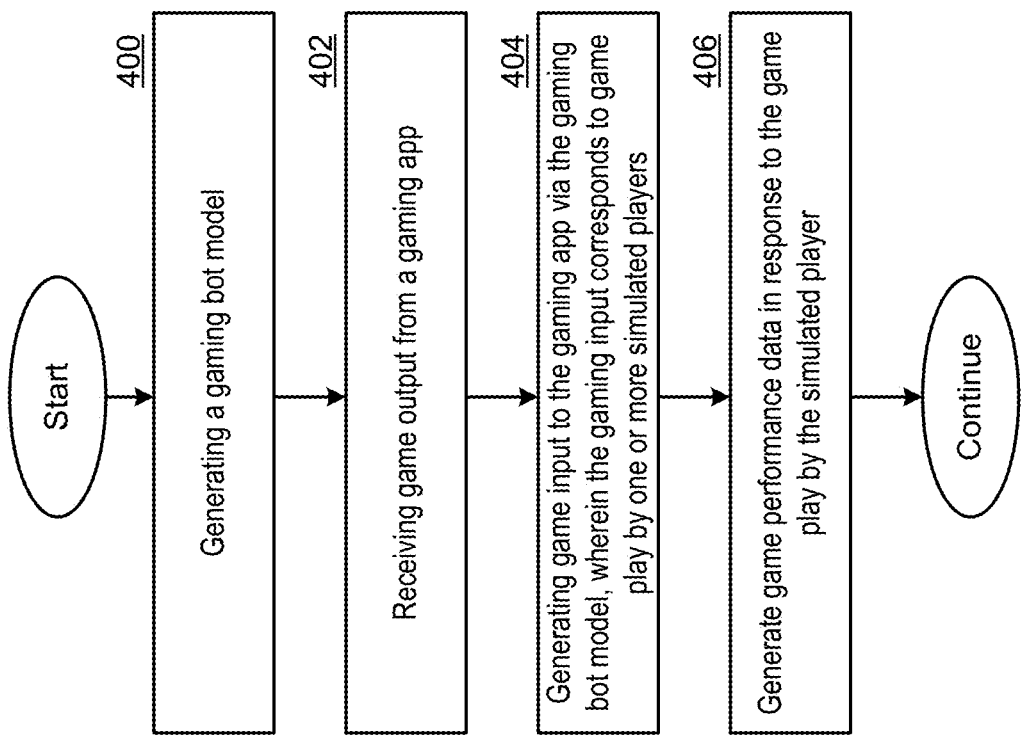
FIG. 4 presents a flowchart representation of a method in accordance with an embodiment of the present disclosure.

FIG. 4 presents a flowchart representation of a method in accordance with an embodiment of the present disclosure. In particular, a method is presented for use with any of the functions and features described in conjunction with FIGS. 1-2, 3A and 3B. In step 400, a gaming bot model is generated that corresponds to a gaming bot, such as any of the gaming bots 250 previously described.

Step 402 includes receiving game output from a gaming application (app) such as gaming application 348. Step 404 includes generating game input to the gaming app via the gaming bot model, wherein the gaming input corresponds to game play by one or more simulated players. Step 406 includes generating game performance data in response to game play by the simulated player. This game performance data can be used to evaluate game content more quickly; to assess the difficulty of levels with randomness with thousand variations of playthroughs; and can include key performance indicators (KPIs) or other game analytics.

Figure 5:
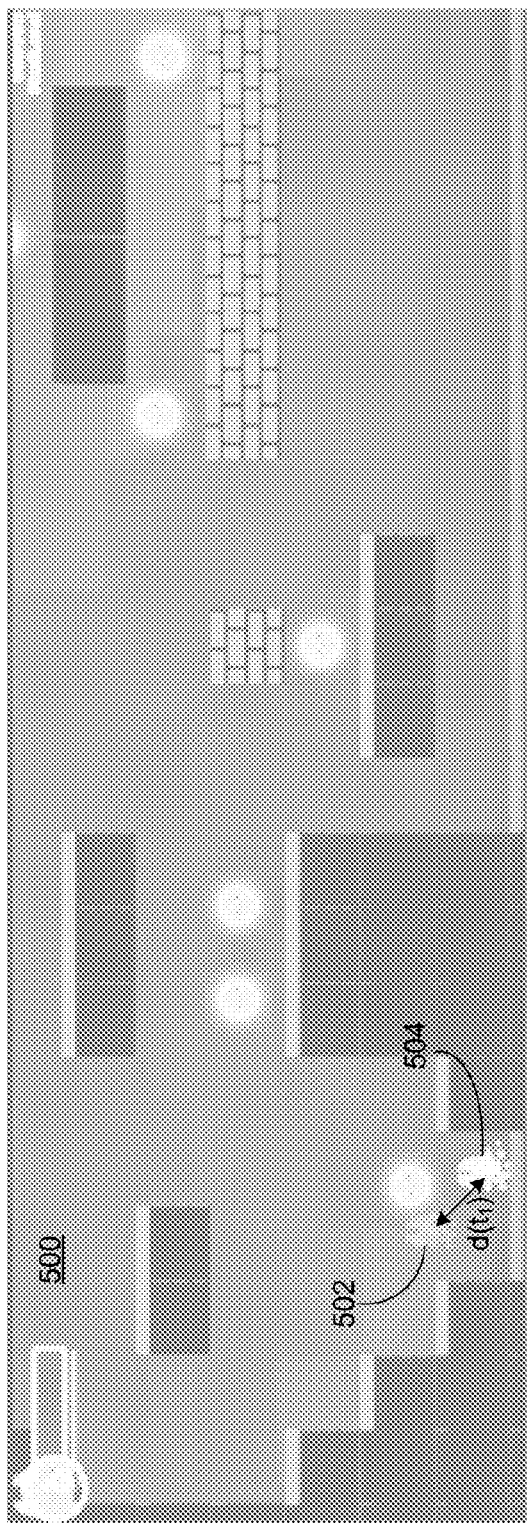
FIG. 5 presents graphical representations of game telemetry data in accordance with an embodiment of the present disclosure.
Figure 5:
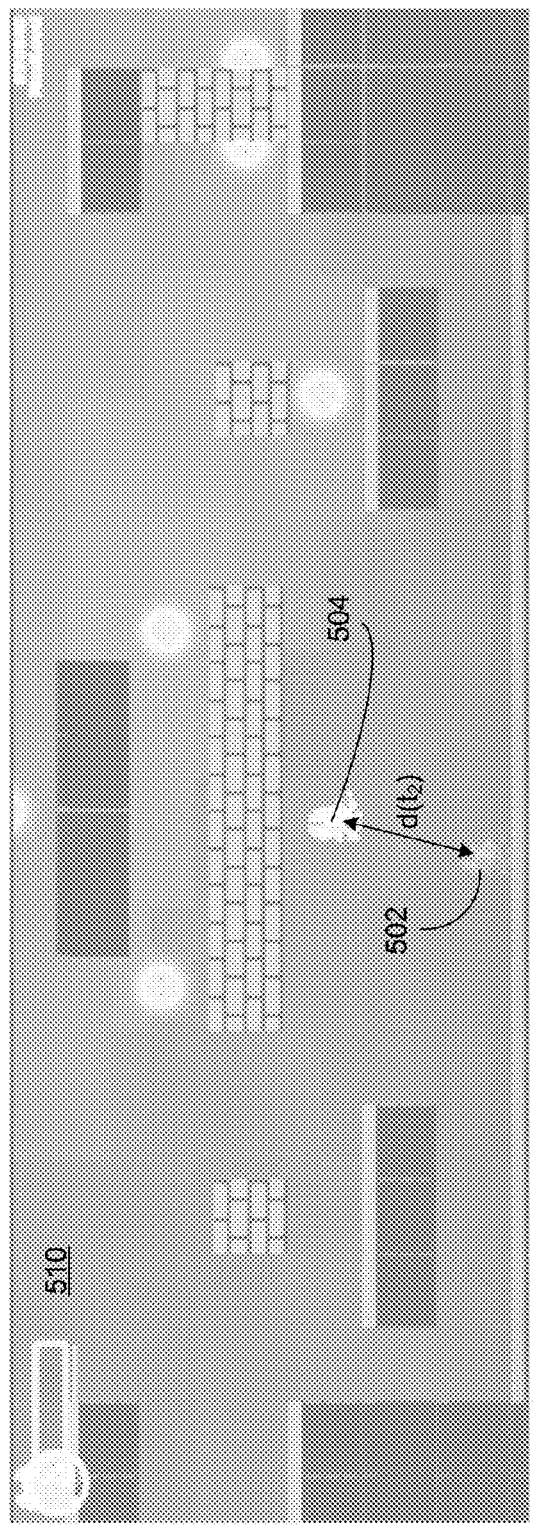

FIG. 5 presents graphical representations 500 and 510 of game telemetry data in accordance with an embodiment of the present disclosure. In various embodiments, the gaming bot includes an artificial neural network trained to imitate an actual player, such as a master player or other human player, based on game telemetry data. The game telemetry data can include frames of video data containing pixel data corresponding to the actual player and the gaming bot. In the particular example shown, game telemetry data in the form of actual game output is presented in diagram 500 at a time $t_1$ and in diagram 510 at time $t_2$. The game telemetry data includes a character 502 that is generated by a gaming bot model such as a gaming bot 250, another AI persona or other AI. The game telemetry data also includes a character 504 that is generated by an actual player, such as a master player, a typical player or other player that the gaming bot model is trying to mimic or simulate.

The game development application 246 generates difference data indicating the difference over time between the position of the character 502 and the position of character 504. For example, the difference over time indicates a pixel distance between the first character generated by the actual player and the second character generated by the gaming bot for a plurality of times. In the example shown in game telemetry data 500, the difference at time $t_1$, $d(t_1)$, is measured as the Euclidean distance between the centroid of characters 502 and 504. In the example shown in game telemetry data 510, the difference at time $t_2$, $d(t_2)$, is measured as the Euclidean distance between the centroid of characters 502 and 504. Considering a time period $t_0$–$t_n$, corresponding to, for example, the length of time it took for the master player to complete a level, the length of time of the sample of the master players play trace or some other time interval, difference data can be generated by integrating or summing the values of $d(t_i)$ for i=0, n.

Difference data generated in this fashion can be used as a measure of fit to update the gaming bot to more closely imitate the master player. In various embodiments, the gaming bot includes an artificial neural network trained to imitate the actual player based on game telemetry data. For example, a gaming bot 250 can use reinforcement learning to learn how to "shadow" the human master player, while also learning from the environment how to cope with new, unseen conditions. Updating the gaming bot 250 can include iteratively retraining the gaming bot via reinforcement learning to adjusted gaming bot configurations, iteratively generating updated difference data corresponding to the adjusted gaming bot configurations, and accepting one of the adjusted gaming bot configurations when the corresponding updated difference data compares favorably to a difference threshold that indicates, for example an acceptable match between the simulated and actual players. Updating the gaming bot 250 can also include iteratively adjusting the gaming bot to adjusted gaming bot configurations via a search algorithm on the parameters of the gaming bot, iteratively generating updated difference data corresponding to the adjusted gaming bot configurations, and accepting one of the adjusted gaming bot configurations when the corresponding updated difference data compares favorably to a difference threshold, that indicates an acceptable or desired fit, for example.

A distance measurement from the master to the shadow is used to understand how close it is to replicating the human behavior. It should be noted that values $d(t_i)$ can be linear distance measurements, logarithmic distance measurements or distance measurements transformed by some other nonlinear function. Furthermore, while described above as Euclidean distances, other distances including non-Euclidean distances, non-parametric distance rankings and other monotonic measures can likewise be employed.

While described above in terms of an accumulated distance measurement, the difference data can include one or more other measurements in addition to or as an alternative to distance, such as the difference in accumulated game score between the gaming bot and the human player during the time period $t_0$–$t_n$, the difference in game achievements between the gaming bot and the human player during the time period $t_0$–$t_n$, a time difference in reaching a game goal between the gaming bot and the human player during the time period $t_0$–$t_n$, a difference in other game metrics or other game analytics between the gaming bot and the human player and/or any combination thereof.

Figure 6:
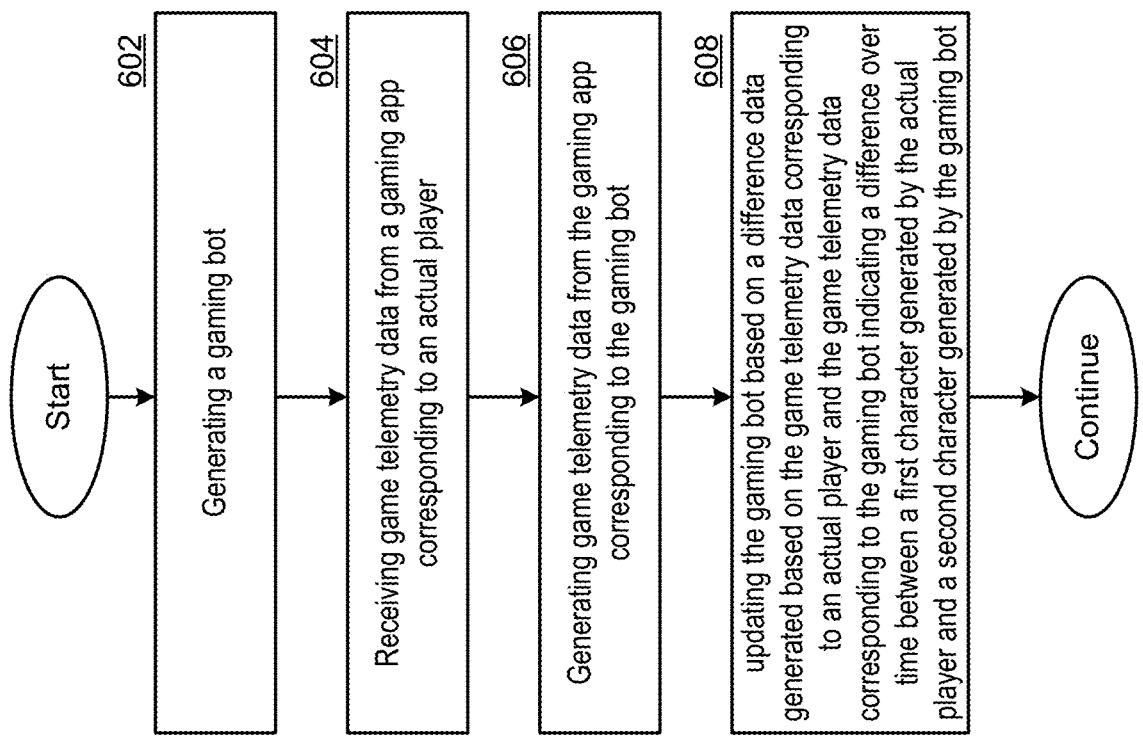
FIG. 6 presents a flowchart representation of a method in accordance with an embodiment of the present disclosure.

FIG. 6 presents a flowchart representation of a method in accordance with an embodiment of the present disclosure. In particular, a method is presented for use with any of the functions and features described in conjunction with FIGS. 1-2, 3A, 3B, 4 and 5. Step 602 includes generating a gaming bot. Step 604 includes receiving game telemetry data from a gaming app corresponding to an actual player. Step 606 includes generating game telemetry data from the gaming app corresponding to the gaming bot.

Step 608 includes updating the gaming bot based on a difference data generated based on the game telemetry data corresponding to an actual player and the game data corresponding to the gaming bot indicating a distance over time between a first character generated by the actual player and a second character generated by the gaming bot.

In various embodiments, the difference over time indicates a distance between the first character generated by the actual player and the second character generated by the gaming bot for a plurality of times. The distance can be a Euclidean distance. The difference over time can indicate an accumulation of the distance between the first character generated by the actual player and the second character generated by the gaming bot for each of the plurality of times.

In various embodiments, the difference over time indicates one or more of: a distance between the first character generated by the actual player and the second character generated by the gaming bot for a plurality of times of a time period, a difference in accumulated game score between the gaming bot and the human player during the time period, a difference in game achievements between the gaming bot and the human player during the time period, or a time difference in reaching a game goal between the gaming bot and the human player during the time period.

In various embodiments, the gaming bot includes an artificial neural network trained to imitate the actual player based on game telemetry data. The game telemetry data can include pixel data corresponding to the actual player and the gaming bot, wherein the difference over time indicates a pixel distance between the first character generated by the actual player and the second character generated by the gaming bot for a plurality of times. Step 608 can include iteratively adjusting the gaming bot to adjusted gaming bot configurations, iteratively generating updated difference data corresponding to the adjusted gaming bot configurations, and accepting one of the adjusted gaming bot configurations when the corresponding updated difference data compares favorably to a difference threshold.

Figure 7:
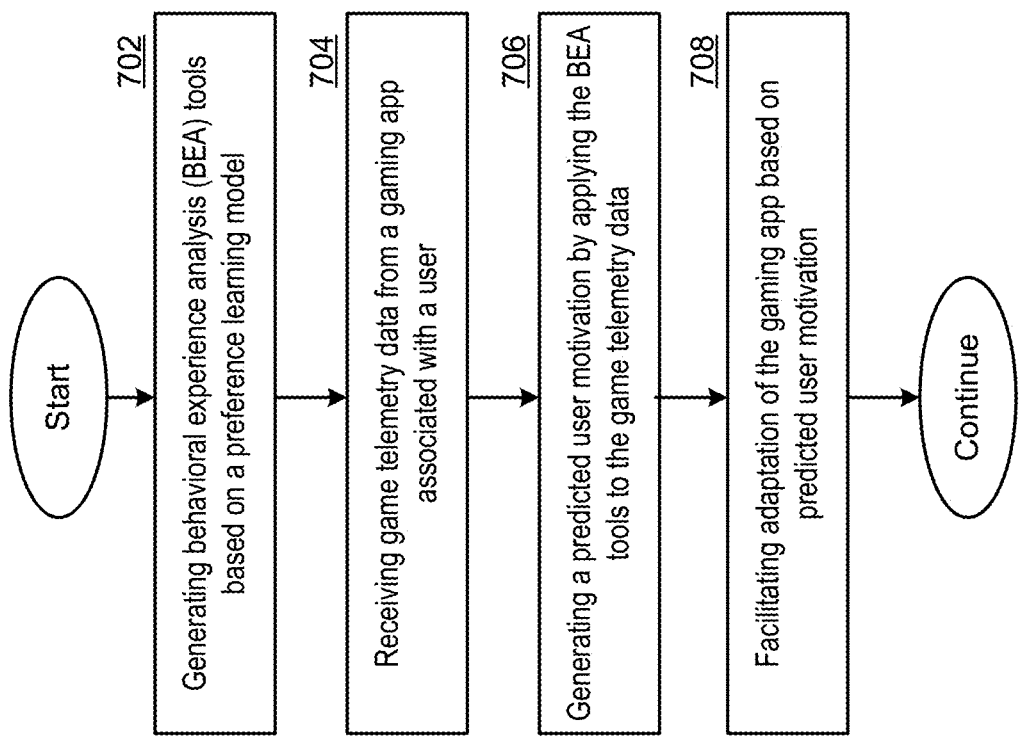
FIG. 7 presents a flowchart representation of a method in accordance with an embodiment of the present disclosure.

FIG. 7 presents a flowchart representation of a method in accordance with an embodiment of the present disclosure. In particular, a method is presented for use with any of the functions and features described in conjunction with FIGS. 1-2, 3A, 3B, and 4-6. Step 702 includes generating behavioral experience analysis (BEA) tools based on a preference learning model. Step 704 includes receiving game telemetry data from a gaming app associated with a user. Step 706 includes generating a predicted user motivation, by applying the BEA tools to the game telemetry data. Step 708 includes adapting the game based on the predicted user motivation.

In various embodiments, the preference learning model is trained based on a plurality of player questionnaires associated with prior game play and further based on prior game telemetry data associated with the prior game play. The preference learning model can be trained using second-order data generated combinatorically from the plurality of player questionnaires. The preference learning model can be implemented via support vector machines. The SVMs can include non-linear SVMs with radial basis function kernels.

In various embodiments, the game telemetry data includes at least one of: playtime data, completion data or progression data. The game telemetry data can include an indication of one of a plurality of player types generated via a clustering analysis on other game telemetry data. The game telemetry data can be generated based on a gaming bot. The game telemetry data can include pixel data associated with game video.

In various embodiments, the system can be implemented via a game development platform that further includes a gaming development application, and wherein facilitating adaptation of the gaming application includes facilitating adaptation of the gaming application via the gaming development application. The gaming application can include a plurality of optional versions, wherein the system is implemented via a gaming system that executes the gaming application, and wherein facilitating adaptation of the gaming application includes selecting one of the plurality of optional versions based on the predicted user motivation.

In various embodiments, facilitating adaptation of the gaming application includes identifying a player mismatch. The predicted user motivation can include motivation data that indicates a score for each of a plurality of motivation factors. The predicted user motivation can include motivation data collected over time that indicates changes in predicted player motivation.

The methods presented herein improve the technology of game development by accurately predicting player motivation automatically, based on game telemetry data. For example, the BEA tools 254 can present the predicted user motivation for each iteration/version of a gaming application, facilitating an iterative adaptation of the game by a user of the game development platform 125 to achieve an adapted version of a game with a predicted user motivation that matches some predetermined desired user motivation. Furthermore, gaming applications can be created with multiple versions that, for example, adapt to the predicted user motivation of individual players—enhancing the experience for the individual player in the game. Players can be matched and/or player mismatches can be avoided based on predicted user motivations, for example, to match the same motivations, to match compatible motivations and/or to avoid incompatible motivations to create engaging experiences for the players. Players who are self-motivated to return to the game, and keep playing, can enhance a game's success.

The central role of motivation for the design of games and the experiences they elicit, has been highlighted by a number of studies which adopt psychological theories of motivation within games. Such studies, however, follow a top-down integration of phenomenological models of motivation, which aim to identify and explain stereotypical player behavior based on qualitative principles. In contrast, games user research and industry-based game testing has shifted its focus towards quantitative approaches based on player analytics with the aim to shed more light onto the understanding of player behavior and experience. Rather than quantifying a plurality of different motivation factors, these approaches focus on either clustering players based on their behavioral patterns or predicting an objectively-defined aspect of their gameplay behavior for monetization purposes (e.g. churn prediction). In that regard, the approaches that aim to capture aspects of player experience (such as engagement or motivation) based on player analytics remain qualitative, given the complexity of measuring subjective notions of user experience in games. There is lack of quantitative studies on the relationship between motivation and play.

Consider the example that follows. The BEA tools 254 can employ a data-driven player modelling approach that, for example, assumes there is an unknown underlying function between what a player does in the game behaviorally—as manifested through his/her gameplay data—and his/her motivation. In particular, the BEA tools 254 can assume that solely behavioral data from a player's gameplay would yield accurate predictors of motivation in games. Motivation can be based on Self Determination Theory—a positive psychological framework for motivation—and examine four core motivation factors: competence, autonomy, relatedness and presence, which is often associated with the theory in the domain of videogames.

The BEA tools 254 can be trained using motivation measurement tools, such as the Ubisoft Perceived Experience Questionnaire (UPEQ), which was developed as a game-specific tool observing player motivation. For example, to infer the relationship between player motivation and gameplay, data was collected from more than 400 players of Tom Clancy's The Division. This data was processed and aggregated and surveys on the players' motivation was collected in relation to the game independently. The UPEQ questionnaire was used to measure players' general levels of competence, autonomy, relatedness and presence in the game. Given the subjective nature of the reported notions, the BEA tools 254 can use a second-order data processing approach and process the reported UPEQ Likert-scale values of the players as ordinal data, and not as scores. The BEA tools 254 can apply simple statistical rank-based methods in preference learning models that are based on support vector machines (SVMs) to infer the function between gameplay and reported factors of motivation. Results suggest that factors of reported motivation can be predicted with high accuracy by relying on a few high-level gameplay features. In particular, the nonlinear machine learned preference learning models of the BEA tools 254 manage to predict the four motivation factors of unseen players with at least 93% accuracy; the best model reaches an accuracy of 97% for presence. The obtained results add to the existing evidence for the benefits of ordinal data processing on subjectively-defined notions and they also validate that motivation can be captured qualitatively with supreme accuracy in the examined game only based on behavioral high-level data of playing.

The motivation models described herein demonstrate several technological improvements. First, player motivation is modelled computationally only through gameplay data in games. Once the BEA tools 254 are trained, user/player motivation can be predicted based only on gameplay data, such as game telemetry data. Second, a second-order methodology is used for treating Likert-scale scores which are used frequently in game testing and games user research at large. This ordinal approach compares the subjective scores of all players with each other and hence combinatorically generates very large datasets based only on small sets of participants. The approach is also effective in eliminating reporting biases of respondents, thereby better approximating the ground truth of reported motivation. Third, the aspects of player motivation are modelled using preference learning based solely on a small number of key gameplay features. Examples of these methodologies were evaluated using the game Tom Clancy's The Division (Ubisoft, 2016) on over 400 players and the predictive capacity of the motivation models for this game reach near certainty (i.e., over 93% of accuracy). Other technological improvements may also be present.

Self-determination theory (SDT) is a positive psychology theory of the facilitation of motivation based on the work of Deci and Ryan. The core theory was developed to contrast earlier frameworks of motivation as a unitary concept, by focusing on the dichotomy of the intrinsic and extrinsic locus of causality behind motivation. The latter is facilitated by external or internal rewards, pressures, and expectations, while the former is based on the intrinsic properties of the activity itself, namely how well it can support the three basic psychological needs of competence, autonomy, and relatedness. Videogames include a fair amount of pressures and rewards which can promote extrinsic motivation, and yet they are generally regarded as good facilitators of intrinsic motivation. Even when short-term shifts in motivation are observed during gameplay, games support the necessary psychological needs for the facilitation of intrinsic motivation on a higher level. In the context of videogames, R. M. Ryan, C. S. Rigby, and A. Przybylski, "The motivational pull of video games: A self-determination theory approach," *Motivation and Emotion*, vol. 30, no. 4, pp. 344-360, 2006 describe the basic psychological needs underlying intrinsic motivation as:

Competence or a sense of accomplishment and a desire for the mastery of an action, which manifests through the proximal and distal goals of the players. This need is generally tied to self-efficacy and a sense of meaningful progression. It is supported through the interactions the players have to master in order to complete the game but not completion in itself Autonomy or a sense of control and a desire for self-determined action, which manifests through meaningful choices, tactics, and strategic decisions the players can take. It is supported through rule systems and different game mechanics that both structure the play experience but allow for a high degree of freedom and meaningfully different outcomes.

Relatedness or a sense of belonging and a desire to connect and interact with others, which manifests through interactions with other players and believable computer agents. It is supported by multilayer interactions, believable and rich non-player characters, narrative design, and even interactions with other players outside the games as well.

Presence or the feeling of a mediated experience is a main facilitator of both competence and autonomy, and can be viewed as having physical, emotional, and narrative components. Indeed, the feeling of presence or the pursue of immersion can be a driving force behind the motivation of gameplay. Based on the strong relationship between STD and presence, both the Player Experience of Need Satisfaction Questionnaire and UPEQ use it to measure a level of involvement with the game which can facilitate other positive psychological needs.

It is important to note that the above factors are not contributing equally to the formulation of intrinsic motivation; while competence or relatedness are regarded as the core catalysts, autonomy generally plays a supporting role in the facilitation of motivation. Nevertheless, in absence of autonomy, motivation can only be considered introjected or compulsive. Within games the main drive of intrinsic motivation is generally competence because of how the activity is structured, while relatedness contributes to enhancing the experience. The BEA tools 254 rely on SDT to quantify the four above-mentioned aspects of motivation. For that purpose UPEQ is used as a game-tailored questionnaire designed to measure the factors of SDT as affected by the gameplay experience. UPEQ was developed by researchers at Massive Entertainment specifically to predict gameplay outcomes relevant for industry designers and stakeholders. UPEQ is able to predict playtime, money spent on the game, and group playtime based on measured factors of SDT. Beyond its utility, UPEQ also addresses the limitations of prior domain-specific SDT questionnaires, such as the Game Engagement Questionnaire, BrainHex, and the Player Experience of Need Satisfaction, while focusing on the adaptation of the Basic Need Satisfaction Scale(s) into a survey specific to videogame play. The result is a reliable and consistent assessment tool with a strong theoretical foundation in SDT.

Preference Learning (PL) is a supervised machine learning technique, in which an algorithm learns to infer the preference relation between two variables. The BEA tools 254 adopt preference learning (PL) models because of the strong connection between this ordinal machine learning paradigm and how player experience operates in games. In essence, PL models certain psychological processes by focusing on the differences between occurrences instead of their absolute values. This approach has the advantage that it aligns more closely to the players' cognitive processes—e.g. anchoring-bias, adaptation, habituation, and other recency-effects—that help them evaluate their own experience internally.

PL is a robust method, which relies on relative associations instead of absolute values or class boundaries and is instead based on the pairwise transformation of the original dataset into a representation of the differences between feature vectors in the query. This transformation of the dataset reformulates the original problem in a way that a binary classifier can solve it. In new dataset, the direction of the preference relation can be associated with one of two classes. As an example, observe the preference relation:

$$x_i > x_j \in X(x_i \text{ is preferred over } x_j)$$

based on their associated output:

$$y_i > y_j.$$

Through the pairwise transformation two new features are created:

$$xI = (xi - xj),$$

associated with $$y_1' = 1 \text{ and } x_2' = (x_j - x_i),$$

associated with $$y_2' = -1.$$

This comparison between each pair of feature vectors provides $$X' \subseteq \frac{X \times (X-1)}{2}$$

new datapoints. xI is a subset of all possible unique combinations because a clear preference relation is not always inferable.

The BEA tools can also use ranking Support Vector Machines (SVM) as they are implemented in the Preference Learning ToolboxI, which is based on the LIBSVM library. SVMs can yield robust models even with a limited amount of data and input features. SVMs were originally employed to solve classification tasks by maximizing the margins of a hyperplane separating the datapoints projected into a higher dimensional feature space but were later adopted to solve PL tasks as well. The BEA tools 254 can use both linear and non-linear SVMs with radial basis function (RBF) kernels. Unlike linear SVMs, which aim for a linear separation between datapoints, RBF SVMs emphasize the local proximity of datapoints, fitting the maximum-margin hyperplane in a transformed feature space. For tuning these algorithms, the BEA tools 254 can rely on the C regularization term which controls the trade-off between maximizing the margin and minimizing the classification error of the training set, and—in case of RBF kernels—the $\gamma$ hyperparameter, which controls how each comparison between datapoints is weighted in the non-linear topology by limiting the variance of the similarity measure between points.

The data analyzed in this example is in-game behavioral data (player metrics) and survey questionnaire responses from players of Tom Clancy's The Division (Ubisoft, 2016), hereafter "The Division". The Division is an online multi-player action-role playing game that combines a character progression system with third-person, cover-based, tactical shooting combat mechanics. The game is set in a post-apocalyptic New York which is hit by a smallpox epidemic. Players, as government agents, have to work together (and against each other) to scavenge and investigate the city, which fell into chaos in the aftermath of the pandemic and the rise of organized crime activity.

The core of the game is a progression system, in which players gain new levels by participating in different in-game activities including story-focused and optional missions to un-lock new abilities, and gain new equipment including weapons and armor. The strength of a player can be measured by their level (up to 30) and the quality of their equipment is expressed in Gear Score points. In the player versus environment (PvE) sections of the game, players can group up and complete missions together. The Game also features a competitive player versus player (PvP) area—called Dark Zone—which has its own progression system. In this special area players can still group up to complete missions for better equipment; however they can also turn on each other and become Rogue by killing other players and taking their rewards for themselves. After reaching the maximum level, players can participate in Incursions, which are particularly difficult missions for groups. Ubisoft also released a number of expansions for the game in the form of downloadable content (DLC), which added new areas, equipment, and both PvE and PvP content to the game. The game was not only well received (80/100 Metacritic score on consoles2) but was also the best-selling game of Ubisoft at the time of its release3. As the game integrates different systems from massively multiplayer online role-playing games and multiplayer shooters and supports different play styles and interaction modes (i.e. player-environment and player-player), it provides a rich and complex game testbed for research on motivation.

The collected data consists of aggregated information on the in-game activity of players over a long period of time and their corresponding UPEQ survey scores. These two types of data were collected independently, with the gameplay features recorded between and the survey data collected through a web interface separately. As such, the survey data measures a general disposition of the players.

The dataset consists of one datapoint per player and, in total, 443 players participated in the above-mentioned data collection process. Approximately 51% of the subjects were young adults, between 18 and 34 years old, while 9% were underage (15-17), 34% between 35 and 54, and 6% above 55. Country-wise, 23% of the respondents were from the United Kingdom, 15% from Australia, 14% from Sweden, 9% from Denmark, 5% from Finland, 5% from Norway, 1% from New Zealand, with the remaining 28% not providing an answer.

The dataset was cleaned of datapoints with missing values, corrupted entries, and outliers to prevent skewing any statistical analysis process. An extensive pruning was necessary due to outliers distorting the distribution of general game metrics and due to noise generated by the data logging service which inflated playtime. After the cleaning process the dataset contains 298 players.

To represent computationally the player's behavior within the game, 30 high-level gameplay features are employed that can be extracted from a broader range of game telemetry data. While most of these are simple aggregated game metrics describing the time allocation and progression of the player, 4 of these gameplay features are exclusive categories of distinct play styles or player types based on sequence-based profiling of the player's in-game activities performed via cluster analysis. Additionally, the dataset contains 4 Likert scores that represent the four motivation factors of each player as measured by the UPEQ survey. The three types of data considered are detailed as follows:

Game Metrics: These raw features can be categorized as relating to general playtime (Days Played, Days in Groups, Days in the Dark Zone, Sessions, Playtime, Group Playtime, Dark Zone Playtime, Playtime as Rogue); completion (Non-Daily Missions, Daily Missions, Side Missions, Days with Incursions, Incursions); progression (Gear-Score, Dark Zone Rank, Level, Early Level 30, Reached Level 30); early gameplay (Level <30, Early Playtime, Early Group Playtime, Early Dark Zone Playtime, Early Playtime as Rogue); and DLC gameplay (Underground Playtime, Survival Playtime, Season-Pass).

Player Types: The 4 different player types are named Adventurer, Elite, PvE All-Rounder, and Social Dark Zone Player. These types can be derived through a traditional k-means clustering of aggregated game data.

Motivation Factors: UPEQ scores the four factors of motivation in the form of averaged Likert-scale values. While computing the mean of ordinal data can be problematic conceptually, average survey scores are a wide-spread method of using Likert-like data as they can still show certain tendencies within the scores (e.g., a higher score is assumed to correspond to an overall more positive response). As mentioned in previously, a second-order modelling approach is used to treat these scores as ordinal data through pairwise comparisons across all players.

As the original dataset contains one datapoint per player, individual feature vectors used for the preference learning task are independent. This means that during the preparation of the PL experiments, each datapoint is compared to every other point during the pairwise transformation of the dataset. This transformation applies a preference threshold (Pt) parameter, which controls the margin of significance under which two datapoints are considered equal. The purpose of a threshold Pt is to counter the noise in the ground truth data which can skew modelling results. Additionally, to translating the relationship of datapoints into preference relations, this step also creates new datapoints for the machine learning task. The size of the dataset is nearing a quadratic proportion to the original dataset, with 64, 705 training and 775 testing points on average depending on the ground truth and the optimal Pt parameter. Furthermore, because each pairwise comparison creates two new datapoints—describing the preference relation in both directions—the transformation balances the baseline of the classification task to 50% accuracy.

All PL models are validated with 10-fold cross validation. To prevent data leakage, the training and test folds are separated before the normalization and pairwise transformation of the data. A z-normalization technique can be applied to both the training and the test set before the transformation. To preserve the independence of the test set, assume that it is drawn from the same distribution as the training set and apply the same transformation to the corresponding test set as well.

The optimal parameters of the RankSVMs are found through exhaustive search within value bounds. In particular, the method searches exhaustively the triplets of C, gamma and Pt values that yield the highest 10-fold cross-validation accuracies. The C regularization term is searched within $$C=\{1,2,3,4,5\},$$

the gamma RBF parameter in $$\gamma \in \{0.1, 0.5, 0.75, 1, 2\}.$$

and the optimal preference threshold in $$P_t \in \{0, 0.5, 1\}.$$

While the best gamma parameter was found to be 0.5 over all experiments, C and Pt were more sensitive to the topology of the data; see FIG. 3. The C and Pt parameters selected were C=2, Pt=1 for competence; C=1, Pt=0 for autonomy; C=4, Pt=1 for relatedness; C=3, Pt=0.5 for presence for linear SVMs and C=3, Pt=0.5 for competence; C=4, Pt=0 for autonomy; C=4, Pt=0 for relatedness; C=2, Pt=0.5 for presence for RBF SVMs.

In the first implementation only the four play styles are used as input of the SVM model to test their predictive capacity of motivation. Despite the low dimensionality of the input feature set, both linear and non-linear models are able to surpass the 50% baseline respectively with 3.7% and 3.57% accuracy on average across all models.

In the second implementation the PL models only considering the 26 game metrics as model inputs. Game metrics alone are fairly successful in predicting the reported motivation factors. In particular, linear SVM models are successful with an average accuracy of 65.89% across all models while the best models for individual factors are performing at almost 80% accuracy on certain folds: 79.66%, 75.62%, 71.69%, and 79.68%, respectively, for competence, autonomy, relatedness, and presence. Relatedness appears to be the easiest factor to predict for the linear models, which is not surprising given that relatedness correlated with the most individual game metrics during the statistical analysis. On the other hand, linear SVMs can struggle with autonomy, which can be explained by the low amount of correlations between autonomy and the other features found during the descriptive statistical analysis of the data.

Non-linear kernels further improve the model's performance to a 75.62% accuracy on average across all models. The best individual models vastly outperform the corresponding linear models reaching almost 90% accuracy (competence: 86.73%; autonomy: 89.31%; relatedness: 89.95%; and presence: 87.60%). Compared to linear models, RBF SVMs appear to be more robust across any motivation factor as they manage to improve greatly even the poor-performing linear models (i.e., autonomy). Unlike the poor performances obtained with the models based solely on play styles, models based on game metrics are very accurate and robust across all four factors.

The inclusion of player type or other high-level play style profiles can enhance the predictive capacity of game metrics by adding domain-specific information. Including play style with the other 26 game metrics in the PL task, improves the accuracy of the non-linear models beyond the capabilities of models based on game metrics alone. On the one hand, the linear models are only reaching 65.92% on average across all tests (79.66%, 70.94%, 71.79%, and 76.52%, respectively, for competence, autonomy, relatedness and presence) which is comparable to the performance obtained by the models based on game metrics. On the other hand, models using a non-linear RBF kernel reach accuracies of 82.36% on average and achieve accuracy values above 93% in their highest performing folds: 93.01%, 94.35%, 95.02% and 96.83%, respectively, for competence, autonomy, relatedness and presence. Even in cases of no obvious linear relationship between individual features and motivation factors, non-linear PL techniques can provide efficient methods for predicting motivation and offer an insightful qualitative tool for game design.

Figure 8:
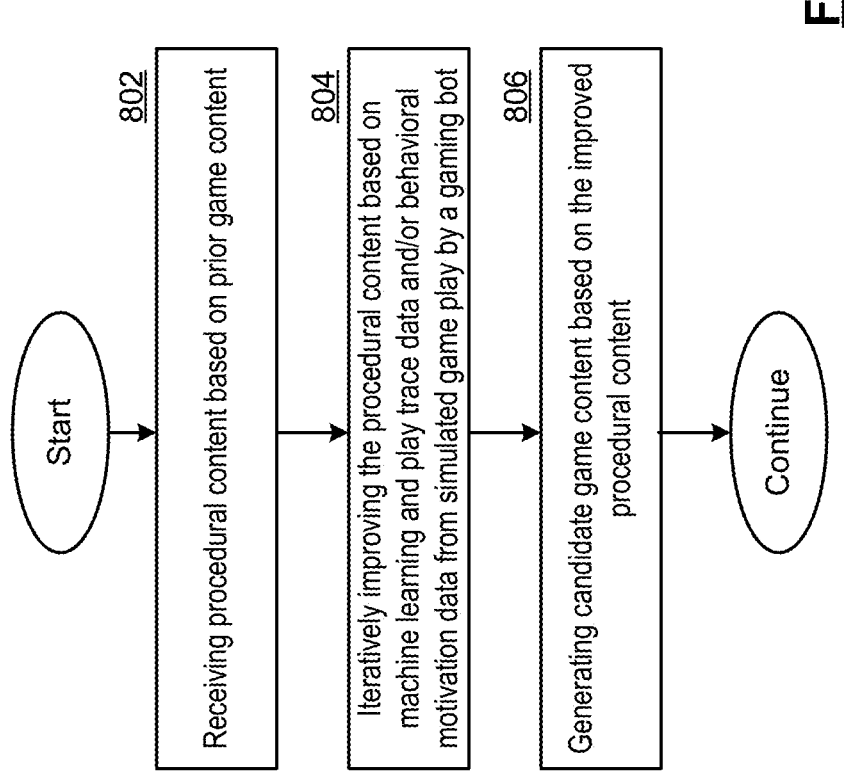
FIG. 8 presents a flowchart representation of a method in accordance with an embodiment of the present disclosure.

FIG. 8 presents a flowchart representation of a method in accordance with an embodiment of the present disclosure. In particular, a method is presented for use with any of the functions and features described in conjunction with FIGs. FIGS. 1-2, 3A, 3B, and 4-7. Step 800 includes receiving, via a system including a processor, procedural content based on prior game content. Step 804 includes iteratively improving, via the system, the procedural content based on machine learning and play trace data and/or behavioral motivation data from simulated game play by a gaming bot. Step 806 includes generating, via the system, candidate game content based on the improved procedural content.

Figure 9:
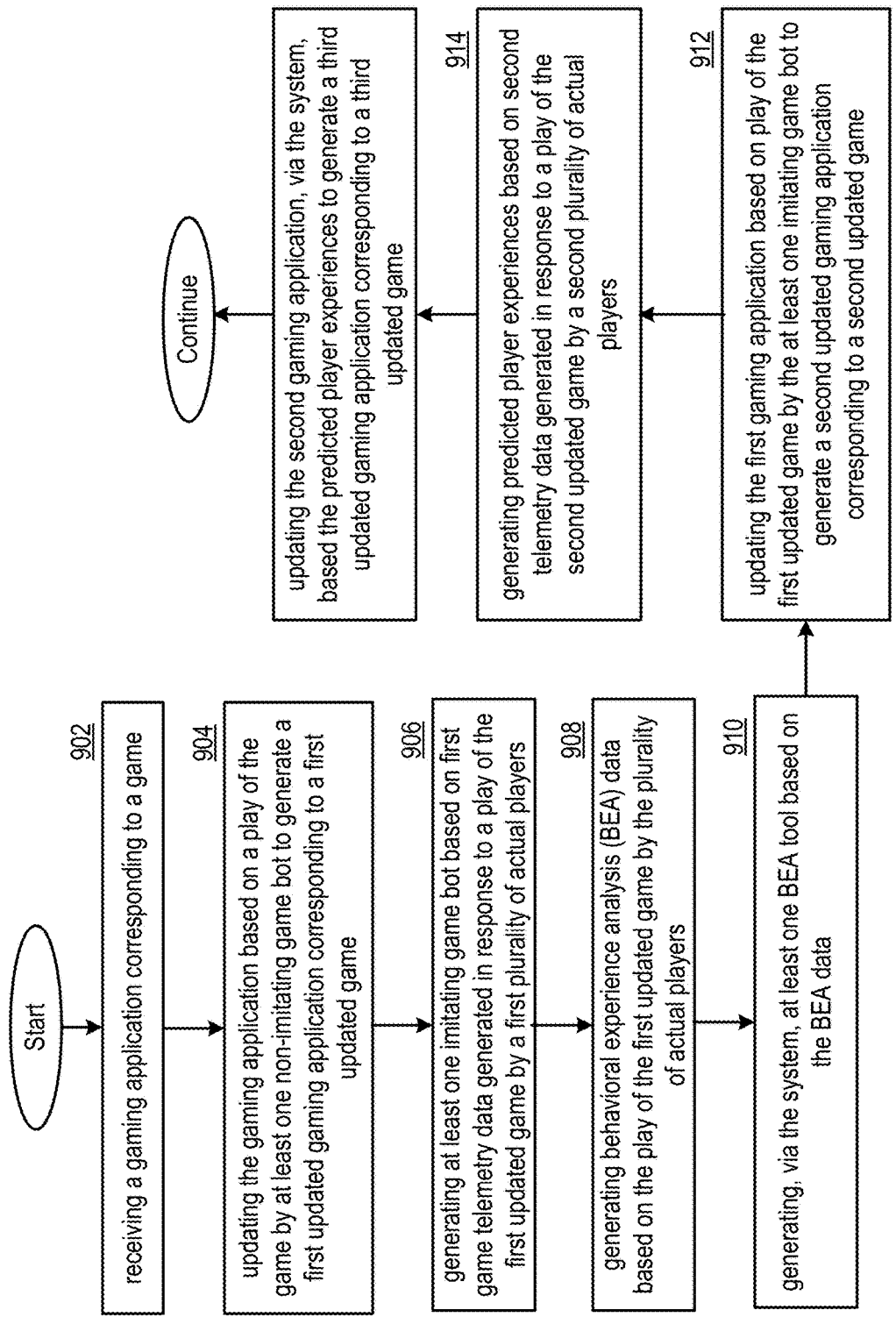
FIG. 9 presents a flowchart representation of a method in accordance with an embodiment of the present disclosure.

FIG. 9 presents a flowchart representation of a method in accordance with an embodiment of the present disclosure. In particular, a method is presented for use with any of the functions and features described in conjunction with FIGs. FIGS. 1-2, 3A, 3B, and 4-8. Step 902 includes receiving, via a system including a processor, a gaming application corresponding to a game. Step 904 includes updating the gaming application, via the system, based on a play of the game by at least one non-imitating gaming bot to generate a first updated gaming application corresponding to a first updated game. Step 906 includes generating, via the system, at least one imitating gaming bot based on first game telemetry data generated in response to a play of the first updated game by a first plurality of actual players. Step 908 includes generating, via the system, behavioral experience analysis (BEA) data based on the play of the first updated game by the first plurality of actual players. Step 910 includes generating, via the system, at least one BEA tool based on the BEA data. Step 912 includes updating the first gaming application, via the system, based on play of the first updated game by the at least one imitating gaming bot to generate a second updated gaming application corresponding to a second updated game. Step 914 includes generating predicted player experiences, via the system, based on second telemetry data generated in response to a play of the second updated game by a second plurality of actual players. Step 916 includes updating the second gaming application, via the system, based the predicted player experiences to generate a third updated gaming application corresponding to a third updated game.

In various embodiments, the imitating gaming bot includes an artificial neural network trained to imitate the actual players based on the first game telemetry data. The non-imitating gaming bot can includes an artificial neural network trained based on at least one prior game and/or based on at least one prior version of the game.

In various embodiments, the BEA data includes motivation data that indicates a degree to which players are motivated by at least one of a plurality of motivation factors. The plurality of motivation factors includes at least one of: competence, autonomy, relatedness, presence, competition, completion, fantasy, destruction, discovery, strategy, excitement, power, high score, being constantly challenged, being challenged with some other frequency, reaching game goals and achievements, completing levels, relaxing, exploring, avoiding boredom, beating other players, spoiling other players games, cheating, avoiding other players that cheat and/or spoiling other players that cheat. The at least one BEA tool can further predict player experiences based on the second game telemetry data and updating the second updated gaming application can be further based on the predicted player experiences. The processor can executes a game development application stored in a non-transitory computer readable storage medium.

Figure 10:
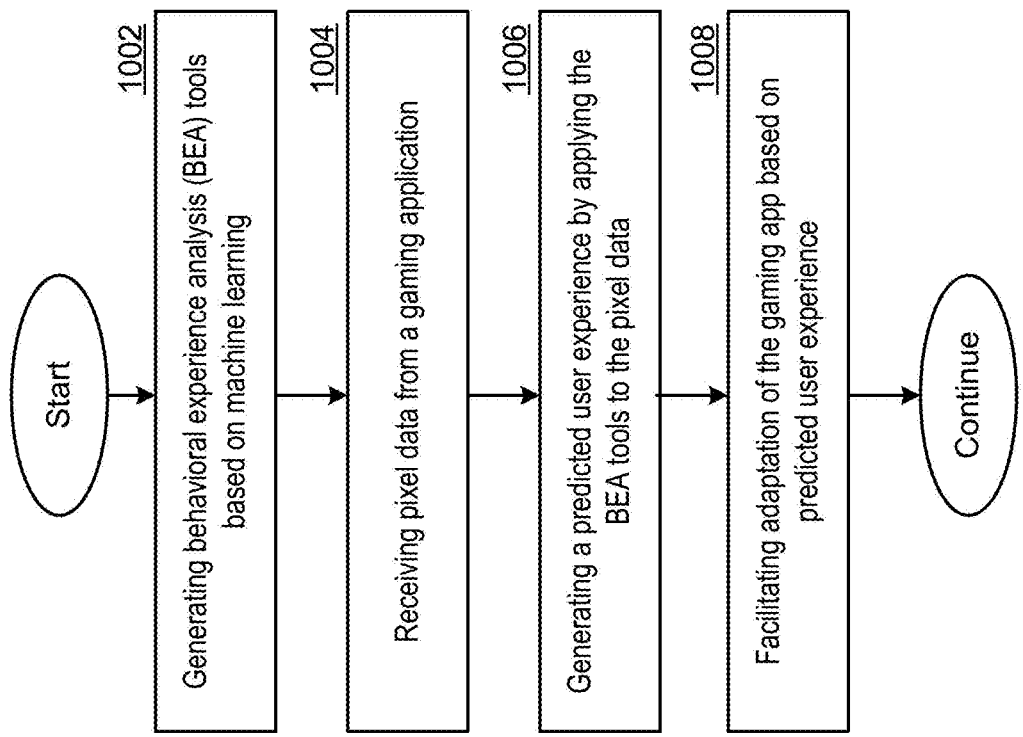
FIG. 10 presents a flowchart representation of a method in accordance with an embodiment of the present disclosure.

FIG. 10 presents a flowchart representation of a method in accordance with an embodiment of the present disclosure. In particular, a method is presented for use with any of the functions and features described in conjunction with FIGS. 1-2, 3A, 3B, and 4-9. While the foregoing has largely focused on artificial intelligence models that are trained based on game telemetry data such as data gathered from play traces that can include, for example, game output, player input, game status, game events, game achievements, progress toward game goals, game parameters, KPIs and other game analytics, etc., pixel data from a gaming application can also be used to generate artificial intelligence models that can be used, for example, to predict user experience in the form of user motivation and/or to perform any of the other functions and features described in conjunction with the game development platform 125 including, but not limited to, the PCG or BEA tools discussed herein.

Step 1002 includes generating, via a system including a processor, behavioral experience analysis (BEA) tools based on machine learning. Step 1004 includes receiving, via the system, pixel data from a gaming application. Step 1006 includes generating, via the system, predicted user experience by applying the BEA tools to the pixel data. Step 1008 includes facilitating, via the system, adaptation of the gaming application based on the predicted user experience.

In various embodiments, the system is implemented via a game development platform that further includes a gaming development application, and wherein facilitating adaptation of the gaming application includes facilitating adaptation of the gaming application via the gaming development application. The gaming application can include a plurality of optional versions, wherein the system is implemented via a gaming system that executes the gaming application, and wherein facilitating adaptation of the gaming application includes selecting one of the plurality of optional versions based on the predicted user experience. Facilitating adaptation of the gaming application can include identifying a player mismatch. The predicted user experience can include motivation data that indicates a score for each of a plurality of motivation factors and/or experience data collected over time that indicates changes in predicted player experience. The pixel data can be generated based on a gaming bot. The machine learning can include a machine learning model trained based on a plurality of player questionnaires associated with prior game play and further based on prior game telemetry data associated with the prior game play.

Consider the example that uses three types of deep convolutional neural network (CNN) architectures to classify between low and high values of annotated arousal traces based on pixel data in a video frame or a video sequence. For example, CNNs were tested in a dataset of 50 gameplay videos of a 3D survival shooter game. All videos have been annotated for arousal by the players themselves (first-person annotation) using the RankTrace continuous annotation tool. The task of predicting affect from the pixels of the experienced content is not only possible but also very accurate. Specifically, the obtained models of arousal are able to achieve average accuracies of over 78% using the demanding leave-one-video-out cross-validation method; while the best models obtained yield accuracies higher than 98%. The results also demonstrate—at least for the examined game—that player experience can be captured solely through on-screen pixels in a highly accurate and general fashion.

The methodologies discussed herein provide several improvements to the technology of game application analysis and design. Player affect/experience can be modelled solely by observing the context of the interaction and not through any other direct manifestation of emotion or modality of user input; in that regard the methods presented are general and user-agnostic. A gameplay screen can be mapped to game experience and used to model and predict a relationship between the two. Three CNNs variants are compared for their ability to infer such a mapping in affective computing; the high accuracy values obtained demonstrate their suitability for the task. These technological improvements to the modeling of player experience facilitate faster, easier and more accurate experience modeling leading to faster, easier and more effective game analysis and design.

The gameplay videos used in these examples were captured from a shooter game developed in the Unity 3D game engine. Specifically, Survival Shooter was used, a game adapted from a tutorial package of Unity 3D. In this game the player has 60 seconds to shoot as many hostile toys as possible and avoid running out of health due to toys colliding with the player's avatar. Hostile toys keep spawning at predetermined areas of the level and converge towards the avatar. The player's avatar has a gun that shoots bright laser beams that can destroy each toy with a few shots. Every toy destroyed adds to the player's score.

The data was collected from 25 different players who each produced and annotated two gameplay videos. Each player played a game session (60 seconds) and then annotated their recorded gameplay footage in terms of arousal. Annotation was carried out using the RankTrace annotation tool which allows the continuous and unbounded annotation of affect using the Griffin PowerMate wheel interface. Gameplay videos were captured at 30 Hz (i.e. 30 frames per second) while the RankTrace tool provided four annotation samples per second.

The corpus of gameplay videos was cleaned by omitting gameplay footage under 15 seconds, resulting in a clean corpus of 45 gameplay videos and a total of 8,093 annotations of arousal. While the average duration of playthroughs in this corpus is 44 seconds, in 60% of the playthroughs the player survived for the full 60 seconds and completed the game level.

In order to evaluate how CNNs can map raw video data to affective states, CNN models were using as input individual frames that contain only spatial information, and video segments that contain both spatial and temporal information. Since RankTrace provides unbounded annotations, the annotation values of each video were converted to values [0, 1] via min-max normalization. The values were synchronized to the recording frequency of videos (30 Hz) with annotations (4 Hz) by treating the arousal value of any frame without an annotation as the arousal value of the last annotated frame. In order to decrease the computational complexity of training and evaluating CNNs, RGB video frames were converted to grayscale and resized to 72×128 pixels; this resulted in a more compact representation which considers only the brightness of the image and not its color. Due to the stark shadows and brightly lit avatar and projectiles in the Survivor Shooter, brightness was deemed more likely a core feature for extracting gameplay behavior. While RGB channels or a larger frame size could be used to provide more information about the gameplay and affect dimensions, it would also provide substantially more data for CNNs to train on. Regarding the input of the CNN, a small number of subsequent frames were deemed adequate to capture the content of a scene. In particular, 8 subsequent frames were used to characterize the player's state of affect. Specifically, the gameplay videos were split into non-overlapping segments of 8 subsequent frames that were used as input to the temporally aware CNN architectures. If the input is a single image, the last frame of each video segment was used.

The output of the CNN is straightforward to compute based on the 8-frame video segments. Since annotations are made at 4 Hz, in most cases a video frame segment would include one annotation. In cases where two annotations are given within 8 frames, their average value is computed. RankTrace produces interval data and thus it may seem natural to state the problem as a regression task; given the aim to offer a user-agnostic and general approach, however, there is no need to make any assumptions regarding the value of the output as this may result in highly biased and user-specific models. The underlying methodology can be considered as a classification task and transform of interval values into binary classes (low and high arousal) using the mean value of each trace as the class splitting criterion. The class split can use an optional threshold parameter (E) to determine the zone within which arousal values around the mean are labelled as 'uncertain' and ignored during classification. While alternative ways of splitting the classes are possible (such as the area under the curve or the median), the examples that follow split a trace based on its mean.

As previously discussed, three example CNN architectures were evaluated. The first two apply 2D trainable filters on the inputs (single frames or videos), while the third applies 3D trainable filters. All CNN architectures have the same number of convolutional and fully connected layers, the same number of filters at their corresponding convolutional layers and the same number of hidden neurons at their fully connected layer. This allows a fair comparison of the ability of these three architectures to map video data to affective states, while at the same time, gaining insights on the effect of temporal information to the classification task. It should be noted that other CNNs for videos and images can use, for example, much larger architectures than the ones employed.

While much of the foregoing discussion has focused on the use of AI models trained on and that utilize pixel data, the audio of the game can also be employed as an input of the AI models of the game development platform 125 including, but not limited to, the BEA tools. In particular, the addition of audio can boost the performance of the AI models by 5-10% depending on the type of game. In particular, pixels-audio AI models of experience can reach accuracies of 90% or more.

Figure 11:
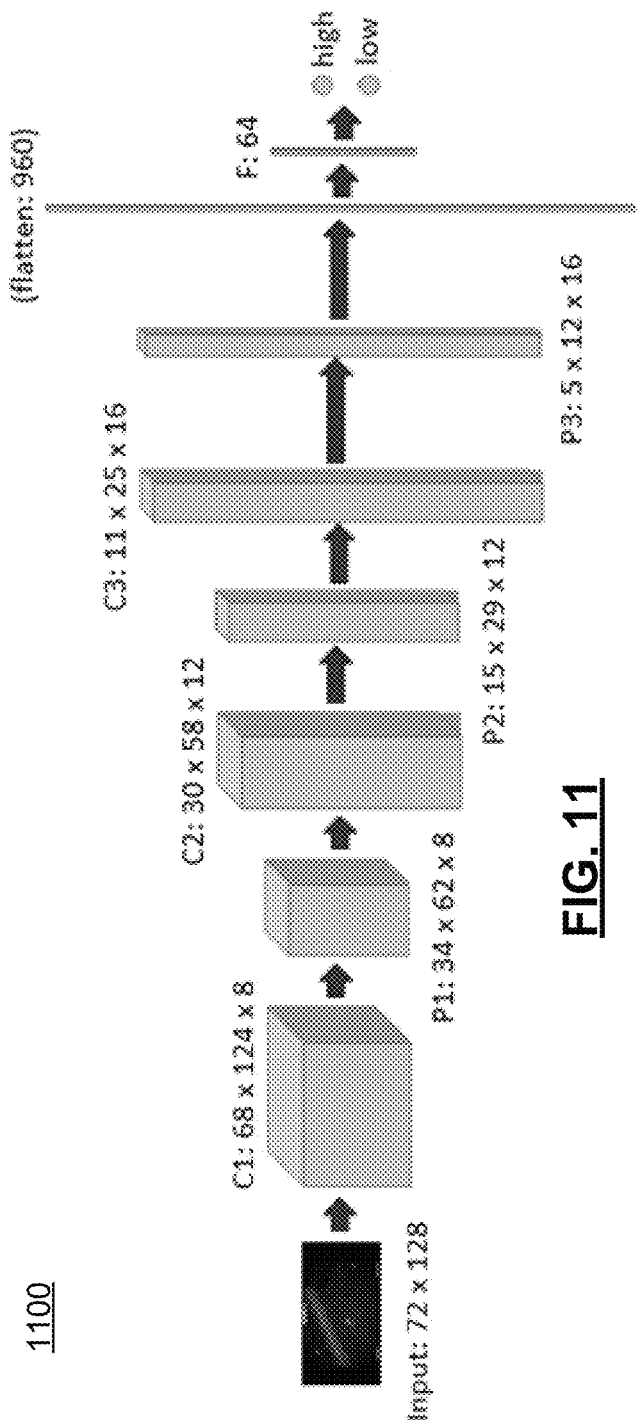
FIG. 11 presents a block diagram representation of a CNN architecture in accordance with an embodiment of the present disclosure.

FIG. 11 presents a block diagram representation 1100 of a CNN architecture in accordance with an embodiment of the present disclosure. Convolutional layers are denoted as a "C", max pooling layers with a "P", and fully connected layers with an "F".

The first CNN example architecture, 2DFrameCNN, uses as input a single frame on which it applies 2D filters. The 2DFrameCNN architecture consists of three convolutional layers with 8, 12 and 16 filters, respectively, of size 5×5 pixels. Each convolutional layer is followed by a 2D max pooling layer of size 2×2. The output of the convolutions is a feature vector of 960 elements, which is fed to a fully connected layer with 64 hidden neurons that connect to the output. This architecture has approximately $6.9 \times 10^4$ trainable parameters and exploits only the spatial information of the video data.

The second CNN architecture, 2DSeqCNN, applies 2D filters to input video segments. The 2DSeqCNN network has exactly the same topology as the 2DFrameCNN architecture but the number of trainable parameters is slightly higher (approximately $7 \times 10^4$) as the inputs are video sequences. This architecture implicitly exploits both the spatial and the temporal information of the data.

The third CNN architecture, 3DSeqCNN, applies 3D filters to input video segments. As with the other architectures, 3DSeqCNN has three convolutional layers with 8, 12 and 16 filters, respectively, of size 5×5×2 pixels. Each one of the convolutional layers is followed by a 3D max pooling layer of size 2×2×1. The 3D convolutional layers produce a feature vector of 1,920 elements, which is fed to a fully connected layer with 64 neurons. Due to its 3D trainable filters, 3DSeqCNN has approximately $14.5 \times 10^4$ trainable parameters. This architecture explicitly exploits both the spatial and the temporal information of the data due to the application of the trainable filter along the spatial and the temporal dimensions While 2DFrameCNN receives as input a single frame, both 2DSeqCNN and 3DSeqCNN receive as input a sequence of 8 frames, i.e. a time slice of the video lasting 267 milliseconds. In all three network architectures, batch normalization was applied on the features constructed by the convolutional layers before feeding them to the last fully connected layer, which in turn feeds two output neurons for binary classification. All of the hyperparameters of the CNN architectures are manually selected in an attempt to balance two different criteria: (a) computational complexity (training and evaluation times), and (b) learning complexity (ability to avoid under-/over-fitting).

All three CNNs were used for classifying gameplay footage as high or low arousal. As mentioned earlier, this binary classification approach is well-suited for unbounded and continuous traces (as the mean of each annotation trace is different) and can produce a sufficiently rich dataset for deep learning. In all reported experiments, a demanding leave-one-video-out scheme was used; this means that data used from 44 videos to train the models and then other data was used to evaluate their performance that is not used for training (i.e. test set). This procedure was repeated 45 times until the performance of CNNs was tested on the data from all videos. During the training of the models, an early stopping criteria was employed to avoid overfitting. For early stopping, data of the 44 videos was shuffled and split further into a training set (90% of the data) and a validation set for testing overfitting (10% of the data). Early stopping can be activated if the loss on the validation set does not improve for 15 training epochs. Reported accuracy is the classification accuracy on the test set, averaged from 45 runs. Significance is derived from the 95% confidence interval of this test accuracy. The baseline accuracy is the average classification accuracy on the test set, while always selecting the most common class in the 44 videos of the training set. Naturally, the baseline also indicates the distribution of the ground truth between the two classes.

The most straightforward way to classify segments of gameplay footage is based on the mean arousal value of the annotation trace, treating all annotations above the mean value as high arousal and below it as low arousal. This simple classification results to a total of 8,093 data points (i.e. 8-frame segments assigned to a class) from all 45 videos.

TABLE I

TEST ACCURACY FOR BINARY CLASSIFICATION OF DIFFERENT CNN ARCHITECTURES, AND FOR DIFFERENT THRESHOLD VALUES FOR CLASSIFICATION (E). THE 95% CONFIDENCE INTERVAL IS INCLUDED.

| E | Baseline | 2DFrameCNN | 2DSeqCNN | 3DSeqCNN |
|---|---|---|---|---|
| 0.00 | 51% ± 0.0% | 70% ± 4.2% | 74% ± 4.7% | 73% ± 4.4% |
| 0.05 | 56% ± 0.3% | 72% ± 5.6% | 73% ± 5% | 73% ± 5.3% |
| 0.10 | 55% ± 0.3% | 74% ± 5.7% | 75% ± 5.6% | 74% ± 5.7% |
| 0.20 | 50% ± 0.3% | 77% ± 5.7% | 78% ± 5.6% | 77% ± 5.7% |

The top row of Table I reports the average classification accuracy of the CNN models with the naive classification method (E=0). All models have accuracies over 20% higher than the baseline classifier, which suggests that CNNs, regardless of the architecture used, have the capacity to map raw gameplay video to arousal binary states. The model that performs best is the 2DSeqCNN, which implicitly exploits the temporal information in the data. Its accuracy is over 3% higher than the 2DFrameCNN which exploits only spatial information, but it is only slightly better than the 3DSeqCNN. The ability of the 3DSeqCNN to explicitly exploit the temporal information does not seem to significantly affect its performance. Comparing the performance of the 2DFrameCNN with the performances of the other two CNN models indicates that although the temporal information contributes to the learning process, the dominant information of the inputs comes from their spatial and not their temporal structure. This may be due to the very short duration of the input video segments (267 milliseconds), or due to strong predictors of arousal existent in the heads-up display of the game.

While classifying all data above the mean value of the arousal trace as high yields a large dataset, the somewhat arbitrary split of the dataset may misrepresent the underlying ground truth and also introduce split criterion biases. Specifically, frames with arousal values around the mean would be classified as high or low based on trivial differences. To filter out annotations that are ambiguous (i.e. close to the mean arousal value A, any datapoints with an arousal value A within the uncertainty bound determined by:

$$E: \bar{A} - E < A < \bar{A} + E$$

Table I shows the performance of different CNN architectures for differing threshold values of E. It should be noted that removing datapoints affects the baseline values quite substantially as representatives of one class become more frequent than for the other class. Regardless, the accuracy of all architectures increases when data with ambiguous arousal values is removed, especially for higher E values. For E=0.20, the accuracy of all three CNN architectures is 26% to 28% higher than the baseline. The 2DFrameCNN also benefits from the cleaner dataset, being second in accuracy only to 2DSeqCNN for E=0.10 and E=0.20. The additional trainable parameters of 3DSeqCNN seem to require more data than what is available in the sparser datasets. Indeed, the number of total datapoints decreases by 12% for E=0.05, by 25% for E=0.10, and by 44% for E=0.20 (for a total of 4, 534 datapoints). It is obvious that having a cleaner but more compact dataset can allow the less complex architectures (2DFrameCNN, 2DSeqCNN) to derive more accurate models but can challenge complex architectures (3DSeqCNN). The trade-off poses an interesting problem moving forward for similar tasks of gameplay annotation.

Examples show that it is possible to produce surprisingly accurate models of players' arousal from on-screen gameplay footage alone—even from a single frame snapshot. Especially when removing data with ambiguous arousal annotations, a model of 2DFrameCNN can reach a test accuracy of 98% (at E=0.20), although on average the test accuracy is at 77%. It is more interesting, however, to observe which features of the screen differentiate frames or videos into low-arousal or high-arousal classes. This can be achieved by showing which parts of the frame have the most influence on the model's pre-diction, e.g. via Gradient-weighted Class Activation Mapping. This method computes the gradient of an output node with respect to the nodes of a convolutional layer, given a particular input. By multiplying the input with the gradient, averaging over all nodes in the layer and normalizing the resulting values, a heatmap can be obtained that shows how much each area of the input contributed to increasing the value of the output node.

Figure 12A:
FIG. 12A presents an image representation of a video frame in accordance with an embodiment of the present disclosure.
Figure 12C:
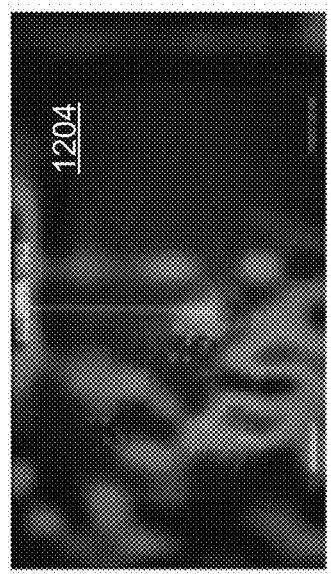
FIGS. 12B and 12C present activation maps in accordance with an embodiment of the present disclosure.
Figure 12B:
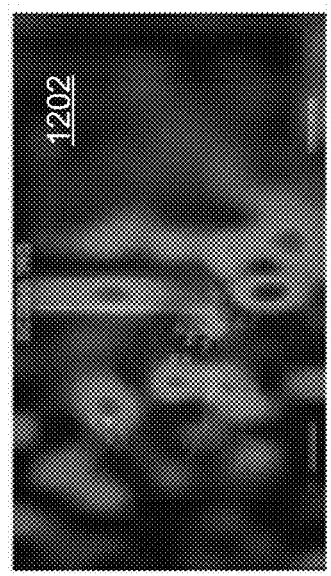

FIG. 12A presents an image representation 1200 of a video frame in accordance with an embodiment of the present disclosure. FIGS. 12B and 12C present activation maps 1202 for activation of low arousal and 1204 for activation of high arousal in accordance with an embodiment of the present disclosure for a sample gameplay frame 1200, calculated based on the 2DFrameCNN. While 2DSeqCNN has higher accuracies, it is far more challenging to visually capture the sequence in static figures, so frame-only information of 2DFrameCNN is presented. It should be noted that both low and high arousal predictors focus on aspects of the heads-up display (HUD) which are overlaid on the 3D world where the player navigates, shoots and collides with hostile toys. Specifically, the score at the top center of the screen contributes substantially to high arousal. Interestingly, the score keeps increasing during the progression of the game as the player kills more and more hostile toys. The impact of time passed in the game—and by extent increasing score—on arousal can be corroborated by the annotations themselves: in most cases the annotators kept increasing the arousal level as time went by rather than decreasing it. Tellingly, of all arousal value changes in the entire dataset, 807 instances were increases and 297 were decreases. Thus, both score and time remaining would be simple indicators of low and high arousal. Interestingly, the HUD element of the player's health was not considered for either class. Among other features of the 3D game world, hostile toys are captured by the low arousal output, while an obstacle next to the player is captured by the high arousal output.

Figures 13A, 13B:
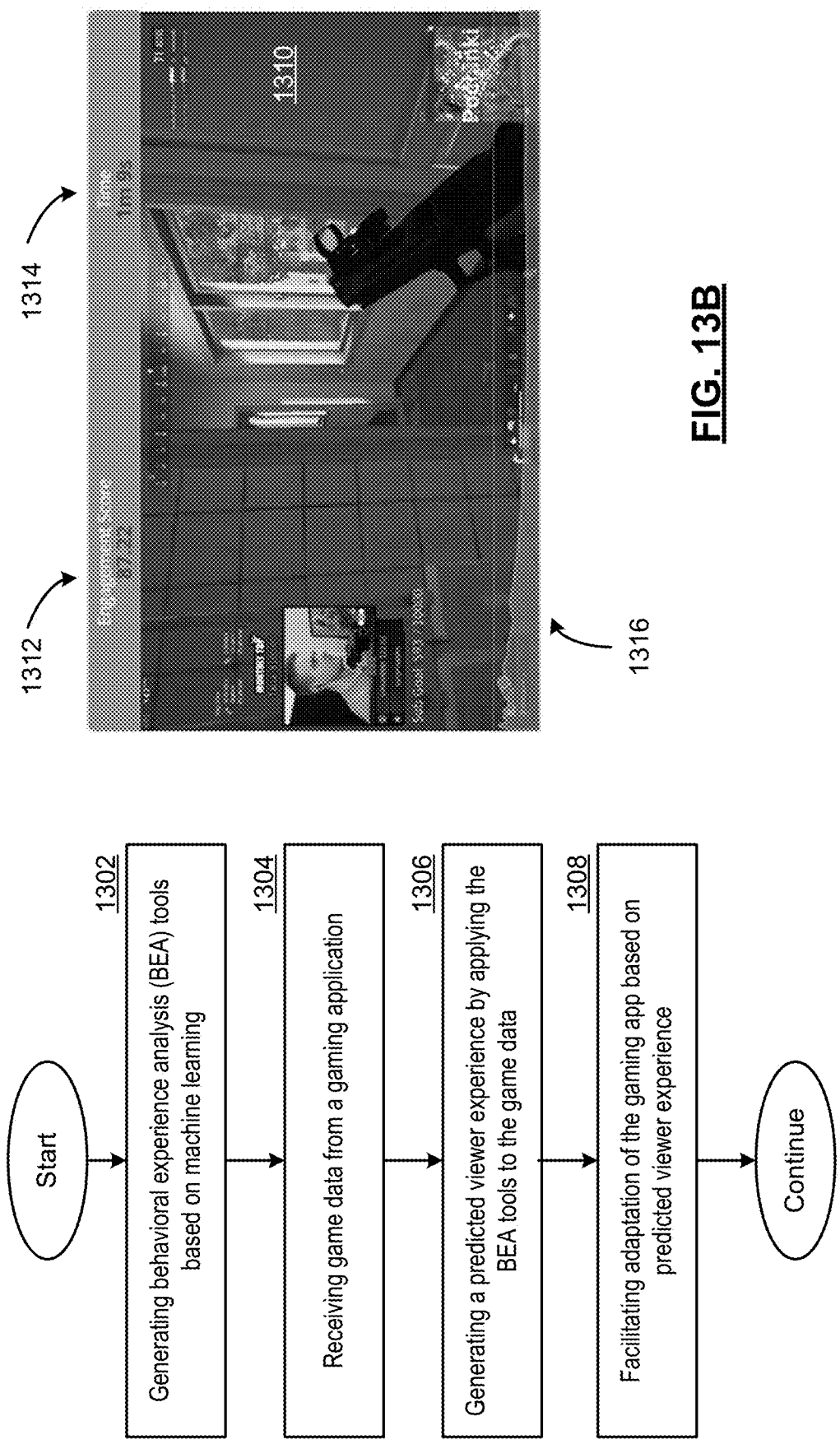
FIG. 13A presents a flowchart representation of a method in accordance with an embodiment of the present disclosure.
FIG. 13B presents an image representation of a video frame in accordance with an embodiment of the present disclosure.

FIG. 13A presents a flowchart representation of a method in accordance with an embodiment of the present disclosure. In particular, a method is presented for use with any of the functions and features described in conjunction with FIGS. 1-2, 3A, 3B, and 4-12. While the foregoing has largely focused on modelling and predicting user experience, motivations and behaviors, the foregoing tools and methodologies can likewise be used, for example, to predict viewer experience and/or to perform any of the other functions and features described in conjunction with the game development platform 125 including, but not limited to, the PCG or BEA tools discussed herein.

Step 1302 includes generating, via a system including a processor, behavioral experience analysis (BEA) tools based on machine learning. Step 1304 includes receiving, via the system, game data associated with a gaming application. Step 1306 includes generating, via the system, predicted viewer experience by applying the BEA tools to the game data. Step 1308 includes facilitating, via the system, adaptation of the gaming application based on predicted viewer experience.

In various embodiments, the machine learning includes a machine learning model trained based on a plurality of player questionnaires associated with prior game play and further based on prior game telemetry data associated with the prior game play. The game data can include chat data from a plurality of viewers. The system can be implemented via a game development platform that further includes a gaming development application, and wherein facilitating adaptation of the gaming application includes facilitating adaptation of the gaming application via the gaming development application. The gaming application can include a plurality of optional versions, wherein the system is implemented via a gaming system that executes the gaming application, and wherein facilitating adaptation of the gaming application includes selecting one of the plurality of optional versions based on the predicted viewer experience. Facilitating adaptation of the gaming application can include identifying a player mismatch. The predicted viewer experience can include engagement data collected over time that indicates changes in predicted viewer engagement.

The reliable estimation of the moment-to-moment gameplay engagement is valuable to game development. Accurate proxies of engagement not only may enhance a game's monetization strategy, they can also be used for rapidly testing games through engagement-driven agents. Such agents can in turn improve player experience and lead to the design of entirely new and engaging gameplay experiences via game content generation. Instead of looking at the player's behavior as a predictor of engagement, the example that follows reframes the modeling problem and looks at gameplay engagement from the viewers' perspective. To this end, engagement can be defined as the active participation of viewers of gameplay assuming, for example, that there is a mapping between the behavioral state of a player while playing a game—that is live streamed to viewers—and the engagement of the audience of that game.

The example that follows use data from a popular video live streaming service (Twitch1) and obtain streamed data from the PlayerUnknown's Battlegrounds—PUBG (PUBG Corporation, 2017) game. To construct models of moment-to-moment gameplay engagement in this example, the relationship between critical events of the game and the corresponding frequency of messages in the chat feed are investigated. In particular, artificial neural networks (ANN) are used that are able to predict gameplay engagement (as attributed to the viewers' chat frequency) at each critical event in the game (e.g. player death, head-shot, kill etc.). The derived ANN models reach accuracies of 80% on average and 85% suggesting that gameplay events can be accurate predictors of viewer engagement and that gameplay can be attributed to viewer behavior through the frequency of chatting. These ANN models are able to predict engagement within and across streamers with similarly high accuracies showcasing the scalability and generalizability of the approach. The outcome of this work is a continuous prediction engagement (engagement line) for any given live PUBG video that is streamed (see FIG. 13B).

FIG. 13B presents an image representation of a video frame in accordance with an embodiment of the present disclosure. In particular, an example screen display 1310 of game play is presented of PUBG that includes, at the top of the screen, an engagement score indicating a current level of predicted viewer engagement 1312 and an indication of the current game time 1314. A track of predicted viewer engagement 1316 over the time of the game is presented near the bottom of the screen 1310.

PUBG is a multiplayer online shooter game, in which a group of players (up to 100 at a time) are dropped into a large open map and left to scavenge for weapons and items, eventually engaging each other in combat until only the winner remains. The gameplay dynamic is characterized by long stretches of traversal and preparation inter-cut by fast bursts of action. As the game progresses, the playable area shrinks, forcing the remaining players closer together, increasing the likelihood of combat. If players remain outside the area of the playable radius they take constant damage; this area is referred to as the Blue Zone. The shrinking of the Safe Zone encompassed by the Blue Zone is played out in phases. In each phase an Evacuation Zone is designated, outside of which players get a warning to evacuate the area. The Blue Zone then shrinks gradually the Safe Zone to the size of the Evacuation Zone. The pacing of the game is occasionally broken up by the bombardment of a random localized area, which is indicated by a Red Zone and forces players to take shelter inside buildings or evacuate the area.

PUBG Corporation provides an API and telemetry service, through which developers and researchers can generate dense datasets of gameplay telemetry. Each session is logged in detail in a hierarchical structure, organized by gameplay events and objects (such as players, pickups, vehicles, and weapons). There are 40 gameplay events and 10 objects available through the API, which cover all players on the level and general game states as well. As this example focuses only on the streamer's content, who is broadcasting their gameplay, data relating to other players (e.g., their position, actions, and combat periods which do not involve the streamer) can be filtered out.

In this example, 40 PUBG gameplay features were extracted. The features can be broken down to 5 main categories: Health, Traversal, Combat, Item Use, and General Game State. The Health category includes the streamer's Health Level and a number of boolean events: Healing, Reviving, Receiving Revive, Armor Being Destroyed Made Groggy, Taking Damage, and Being Killed. The Traversal category includes the distance travelled since the last event (Delta Location), and the In Blue Zone, In Red Zone, Swim Start, Swim End, Vault Start, Vehicle Ride, Vehicle Leave Boolean game events. The Combat category includes the Shot Count, Damage Done scalar values and the following Boolean features: Is Attacking, Weapon Fired, Caused Damage, Destroyed Object, Destroyed Armor, Destroyed Wheel, Destroyed Vehicle, Made Enemy Groggy. The Item Use category keeps track of the Item Drop, Item Equip, Item Unequip, Item Pickup, Item Pickup From Care package, Item Pickup From Loot box, Item Use, Item Attach, Item Detach Boolean events. Finally, the General Game State category includes the Elapsed Time (in seconds), Number of Alive Teams and Number of Alive Players and the Phase of the game (i.e. Blue or Red Zone).

In this example, live PUBG gameplay data was obtained from the Twitch streaming platform. Although Twitch is a general-purpose live-streaming platform, much of the site's traffic is generated by videogame streaming, both casual and competitive. As eSports and game streaming become more and more popular, the need for selecting more engaging streams, or parts of steams, rises. This is especially true to videogame streaming where fast rising trends can upend previously successful genres and new consumer favorites can boost a company. While Twitch connects streamers with viewers, it also provides a platform for viewers to connect with each other. Chatting while watching streamers is a large part of the shared experience. Indeed, contemporary studies on the motivation behind Twitch viewership show that the strongest motivations are social, followed by affective and tension release needs. While viewers do receive some level of gratification from watching streams and engaging with other viewers, cognitive (i.e. learning) and personal integrative (i.e. recognition by peers) needs are less pronounced in the users of the platform.

Moment-to-moment engagement can be measured as the inverse frequency of chat messages in between two consecutive events of the game. This value can be computed as the number of chat messages between consecutive events as normalized in the range between 0 and 1. The prediction of engagement can be viewed as a binary classification task, in which the objective is to predict "high" or "low" engagement labels. In particular, the example considers low and high engaging those events with a message frequency higher and lower, respectively, than a selected threshold, $\alpha$. While it might seem surprising to associate lower frequencies as moments of viewer's high engagement, by qualitatively inspecting the videos it can be observed that the chat room tends to be more quiet when fast-pace action is happening on the screen (i.e., viewers are paying more attention to the screen) and chat more when there are calmer slow-pace moments (e.g., as a manifestation of boredom).

To test to which degree the PUBG engagement could be predicted through telemetry events, in-game events and corresponding chat messages were gathered from the PUBG API and Twitch API, respectively, from five streamers—chocoTaco, Danucd, sprEEEzy, jeemzz and hambinooo—based on their popularity and the availability of datasets which are large enough to be explored through machine learning. Table II presents the streamers' ranking 3, the number of videos and matches collected, the average number of viewers 4, the average duration, the number of chat messages, and the number of events collected within the selected timeframe, for each of the five streamers. Standard deviation is shown in parentheses.

TABLE II

| Streamer | Rank | # Videos | # Matches | # Viewers | Duration | # Chat | # Events |
|---|---|---|---|---|---|---|---|
| chocoTaco | 1 | 8 | 74 | 3789.6 (195.2) | 478.2 (516.9) | 279.7 (363.5) | 290.8 (298.6) |
| Danucd | 2 | 2 | 48 | 2150.0 (861.3) | 636.4 (572.5) | 261.9 (329.8) | 456.2 (392.3) |
| hambinooo | 7 | 3 | 89 | 460.6 (35.3) | 512.7 (558.9) | 91.6 (104.2) | 382.6 (372.8) |
| sprEEzy | 14 | 3 | 34 | 893.0 (342.5) | 813.6 (563.4) | 129.1 (139.6) | 387.6 (289.3) |
| jeemzz | — | 3 | 79 | 1175.3 (334.4) | 429.9 (402.6) | 92.8 (110.9) | 369.9 (359.4) |
| Average | 6.0 (95.9) | 3.8 (2.4) | 64.8 (22.9) | 1693.8 (1325.8) | 574.2 (154.1) | 171.0 (92.5) | 377.4 (58.9) |

Based on these statistics, note that the two top ranked streamers, chocoTaco and Danucd, have a substantially higher number of viewers and chat messages per match compared to the other three streamers, who have comparable numbers in between them. An interesting exception to this popularity ranking is the average match duration of sprEEEzy who seems to be playing roughly two times longer than the other streamers.

After the extraction and preprocessing of the input features and the transformation of the message frequencies into binary labels as discussed above, a total of 119, 345 labeled events were obtained. Independently of the class splitting threshold (a) value chosen, the dataset presents a highly unbalanced ratio between the two classes, with a majority of the labels being classified as high engagement. To balance the dataset, oversampling and undersampling were applied to the minority and majority classes, respectively, resulting to baseline accuracies of 50%. This process was followed individually for the training and validation sets so as to eliminate any data leakage to the validation set.

For all experiments included in this example artificial neural networks (ANNs) were applied as the prediction models, however, other machine learning techniques could likewise be employed. The ANNs used feature a single fully-connected hidden layer composed of 128 nodes, followed by a dropout layer; the network has an output node that predicts high (1) or low (0) engagement. All nodes use the ELU activation function, the learning rate is equal to 1e-5, and the ANN is trained for 100 epochs. In the first set of experiments, the model was trained and tested individually on each of the five streamers. In a second set of experiments the scalability of these engagement models were tested across all the streamers. In an alternative approach, the different play styles are identified and modeled across all streamers.

In this first set of experiments, data points were collected from one streamer only, and the models were validated using a 5-fold cross-validation scheme; the matches are distributed randomly in the folds. To assess which splitting criteria lead to the best performances, four different threshold a values (0.0, 0.1, 0.2, 0.3) were evaluated. This approach may lead to split criteria biases, as the model may learn to classify high and low engagement based on trivial differences in the frequency of the events. To address this challenge, an uncertainty bound ($\epsilon$) was employed when splitting the data in order to filter out any unambiguous datapoints close to the selected threshold value; in particular, all the events where omitted that fall within the range $\alpha +$ or $- \epsilon$. In addition to the four a values, the example explores three different values for $\epsilon = 0.02, 0.05, 0.08$—examining all the possible combinations of $\alpha$ and $\epsilon$ exhaustively, and selecting the configuration with the highest 5-fold cross-validation accuracy. Table III shows the setup selected for each streamer.

TABLE III

| | chocoTaco | Danucd | sprEEEzy | jeemzz | hambinooo | noob | explorer | pro |
|---|---|---|---|---|---|---|---|---|
| $\alpha$ | 0.3 | 0.3 | 0.3 | 0.3 | 0.3 | 0.3 | 0.3 | 0.3 |
| $\epsilon$ | 0.0 | 0.05 | 0.02 | 0.08 | 0.05 | 0.02 | 0.05 | 0.08 |

All individual streamer models of engagement achieve similar performance which reaches 76% to 79% on average. In particular the best accuracies were observed for the streamers Danucd (79.7% on average; 84.3% at best), sprEEEzy (78.0% on average; 82.4% at best), and hambin000 (77.8% on average; 80.43% at best) while slightly lower values are obtained with jeemzz (76.8% on average; 80.8% at best), and chocoTaco (76.0% on average; 83.2% at best). These results already indicate that this methodology can capture the relationship between streamer telemetry and viewer engagement with a very high accuracy across four different streamers.

The findings of the previous set of experiments showcase that capturing the engagement of individual streamers is possible with a very high accuracy. The models can be generalized further to capture the engagement values of unseen streamers. To test the models' generality, a leave-one-streamer-out cross-validation scheme is used, in which the model is trained based on the data collected from four streamers, and tested against the remaining streamer. This process is repeated five times, once for each streamer, and then the results are averaged.

For all the reported experiments (Table IV), the best parameter setup is selected based on an exhaustive search of all combinations of $\alpha$ and $\epsilon$ as previously discussed. The best model found (74.7% on average; 78.7% at best) yields a lower accuracy compared to the accuracies of the models tested on the data of individual streamers. This is unsurprising as a model's generality within-streamer is far easier to achieve than a model's generality across-streamers.

TABLE IV

| | Threshold | | | |
|---|---|---|---|---|
| $\epsilon$ | 0.0 | 0.1 | 0.2 | 0.3 |
| 0.0 | 70.1% ± 1.5% | 70.2% ± 3.2% | 72.8% ± 1.4% | 74.7% ± 3.6% |
| 0.02 | 70.2% ± 2.4% | 71.1% ± 3.6% | 73.1% ± 1.3% | 70.1% ± 11.8% |
| 0.05 | 70.3% ± 2.0% | 71.9% ± 3.4% | 74.1% ± 2.6% | 71.2% ± 11.8% |
| 0.08 | 70.4% ± 1.8% | 73.4% ± 3.3% | 74.2% ± 3.2% | 71.2% ± 11.9% |

Given the results obtained in the first 2 rounds of experiments, it becomes apparent that a general model of engagement across streamers can be performed with some accuracy. It is possible that that streamers depict varying (non-consistent) behaviors across the matches they play, which, if considered, could improve the accuracy of the engagement model. In particular, assume, that there are general patterns of play across streamers that machine learning could capture and associate to engagement—these patterns can be used to aid in training of the model.

To investigate whether the five streamers show different play styles, collected data was clustered. First the raw data was aggregated from the 119, 345 events to 324 matches—the Boolean events were summed (e.g., via Healing) and the scalar values were averaged (e.g., via Delta Location)—and for each match the data was normalized via min-max normalization. To determine the number of clusters present in the data, two different clustering algorithms were employed—k-means and hierarchical clustering—and the outcomes were tested for consistency. First, k-means was applied to the normalized data for k ranging from 1 to 10, and the quantization error was computed—i.e., the sum of the distances of every data point to the corresponding cluster centroid. The results show that the percent decrease of the quantization error when k increases is particularly high with two and three clusters, with a decrease of 53% and 20%, respectively. With higher values of k ($>=4$) the difference is more contained (between 1% and 10%).

An alternative approach to find the appropriate number of clusters is to partition the data in a hierarchical manner starting from every single match and then observe the relationship between the number of clusters and the corresponding squared Euclidean distance that separates those clusters. In this application of hierarchical clustering, the Ward distance metric was used to minimize the total within-cluster variance. This approach yields comparable results to k-means: yielding a squared Euclidean distance threshold higher than 6.6 yields three clusters, while a threshold higher than 10.3 yields two clusters. The analysis performed with these two unsupervised learning algorithms collectively indicates that the most appropriate number of data clusters lies between two and three. Two clusters partition the data into highly unbalanced clusters, with 86 matches (74,947 events) for the first cluster and 238 matches (44,398 events) for the second cluster. Three clusters, however, yield a more uniformly distributed match data partitioning, 105 (42,878 events) and 64 matches (61,609 events) for the first, second and third cluster respectively. Using the information entropy (E) as a measure of the balance of the distribution of the matches obtained, a higher entropy (E=0.94) occurs with three clusters compared to the two clusters solution (E=0.83). Given the high imbalance of matches partitioned with two clusters, and the similarity of results obtained by the two clustering algorithms indicate that there exists 3 clusters in this dataset.

To label the three player styles clustered, an investigation was performed of how the features of gameplay are grouped within each cluster. Four representative game features can be considered across the three clusters. These four features are Delta Location (distance covered in a match), Kill (number of opponents killed in a match), Taking Damage (damage taken by the player in a match), and Time (match duration in seconds). Using popular game culture terminology the first cluster is labelled as Noob play style as in those matches the streamer does not play particularly well, he reaches a low number of kills and is killed frequently. Meanwhile, the matches are much shorter, most likely because the streamer dies within the first minutes of the match. The second cluster of play style is labelled as Explorer: in those matches the streamer explores the map far more—as the Delta Location feature is higher compared to the other two clusters—but the performance of the player is still average, as shown by the Kill and Being Killed features. Finally, the third play style is labelled as Pro as it features matches where the streamer has played his best: he tends to kill more players, to die less often compared to the other two clusters, and while it takes a considerable amount of damage he survives longer (i.e. higher Time values), most likely winning the match.

The distribution of the three play styles can be found across the five streamers and the variation of play styles the different streamers exhibit. Applying this distribution, chocoTaco shows a majority of Noob matches, and a smaller percentage of Pro matches. On the other hand, sprEEEzy appears to be more of an Explorer player type. Hambin000, Danucd, and Jeemzz show a more uniform distribution of the three play styles in their gameplay.

Given the three different play styles, moment-to-moment engagement models can be built on the separate play styles, instead of the streamers. A separate engagement model is trained for each play style. An exhaustive search of the predetermined values of a and E was employed for each play style model. To compare the results obtained, the models are validated using a leave-one-streamer-out cross-validation scheme. All models predict engagement with high degrees of accuracy (over 75% on average) but the model for the Noob play style performs better (78.8% on average, 84.8% at best) than the models for the Explorer (77% on average, 81.4% at best) and the Pro play style (75.4% on average, 80.7% at best). These examples suggest that it is not only possible to rely solely on a number of key gameplay events and predict the level of viewer engagement in a continuous fashion based on standard game telemetry—but this prediction can be performed with high levels of accuracy.

This example improves the technology of game analysis by introducing a continuous moment-to-moment prediction of engagement in games with a particular application on a popular live streamed game. The engagement models obtained are highly accurate and general within and across streamers indicating that the function between viewer engagement and player behavior can be learned accurately.

Figure 14:
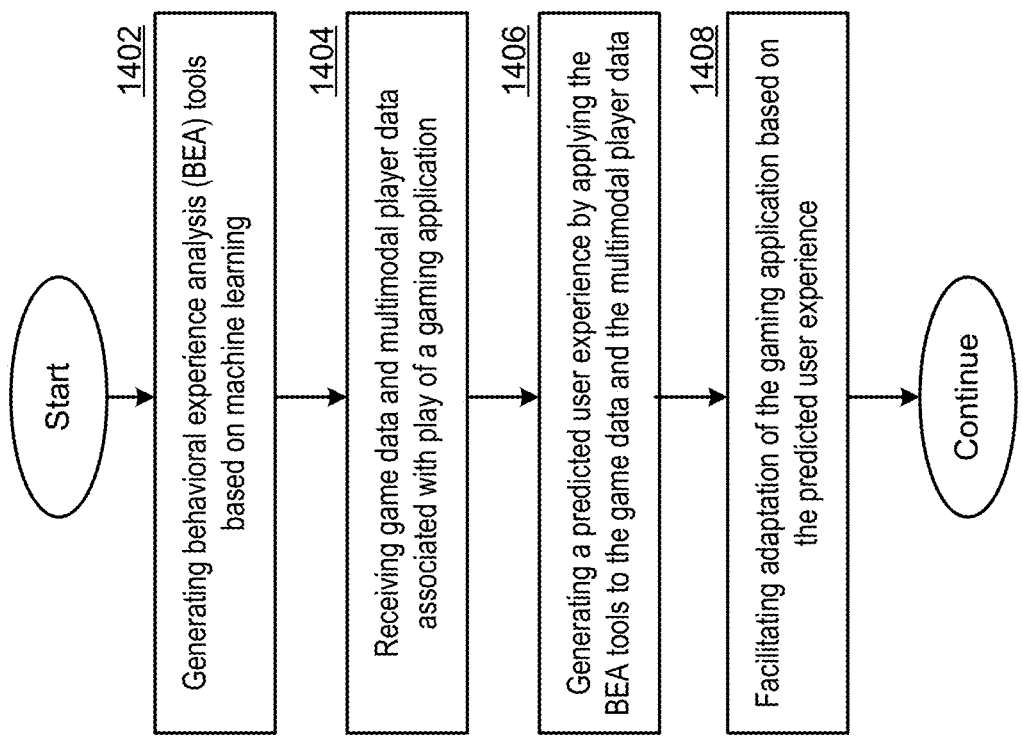
FIG. 14 presents a flowchart representation of a method in accordance with an embodiment of the present disclosure.

FIG. 14 presents a flowchart representation of a method in accordance with an embodiment of the present disclosure. In particular, a method is presented for use with any of the functions and features described in conjunction with FIGS. 1-2, 3A, 3B, and 4-13. While the foregoing has largely focused on modelling and predicting user experience, motivations and behaviors based on individual input modalities, multiple input modalities can be employed to predict user experience and/or to perform any of the other functions and features described in conjunction with the game development platform 125 including, but not limited to, the PCG or BEA tools discussed herein.

In particular, combinations of game data 118 including game telemetry data such as gameplay features, gameplay screen pixels, and/or game audio, can be used with player data 119 such as verbal or non-verbal viewer information, including, for example, multimodal player data such as player verbal information received generated via a microphone, and/or player non-verbal information generated, for example, via a video camera or other sensor. This combination of game data and/or viewer information and behavior with multimodal player data can be used to generate reliable, and general-purpose, predictors of the player's experience. In particular, predictive models based on combinations of game data and/or viewer experience can be supplemented with additional verbal and non-verbal information of the player (e.g. including speech, facial expression, head pose, etc.). This additional information about the players can increase the predictive capacity of the AI models. Methods from ordinal affective computing combined with deep preference learning and other stream-based machine learning algorithms can learn to predict player motivation, player engagement and other experience states with higher accuracies. Once multimodal data of the players (e.g. streamers of content over online platforms) is available, this information can be fused with gameplay features and/or pixels and audio of gameplay and derive even more accurate models of player experience.

Step 1402 includes generating, via a system including a processor, behavioral experience analysis (BEA) tools based on machine learning. Step 1404 includes receiving, via the system, game data and multimodal player data associated with a play of a gaming application. Step 1406 includes generating, via the system, predicted user experience by applying the BEA tools to the game data and the multimodal player data. Step 1408 includes facilitating, via the system, adaptation of the gaming application based on the predicted user experience.

In various embodiments, the machine learning includes a machine learning model trained based on a plurality of player questionnaires associated with prior game play and further based on prior game telemetry data associated with the prior game play. The game data can include at least one of: playtime data, completion data or progression data. The game data can include an indication of one of a plurality of player types generated via a clustering analysis on other game data. The system can be implemented via a game development platform that further includes a gaming development application, and wherein facilitating adaptation of the gaming application includes facilitating adaptation of the gaming application via the gaming development application. The gaming application can include a plurality of optional versions, wherein the system is implemented via a gaming system that executes the gaming application, and wherein facilitating adaptation of the gaming application includes selecting one of the plurality of optional versions based on the predicted user experience. Facilitating adaptation of the gaming application can include identifying a player mismatch. The predicted user experience can include motivation data that indicates a score for each of a plurality of motivation factors and/or motivation data collected over time that indicates changes in predicted player motivation. The game data can be generated based on a gaming bot. The game data can include pixel data associated with game video.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, facial expressions, body stance, gaze patterns, natural language, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
receiving, via a system including a processor, a gaming application corresponding to a game;
updating the gaming application, via the system, based on a play of the game by at least one non-imitating game bot to generate a first updated gaming application corresponding to a first updated game;

generating, via the system, at least one imitating game bot based on first game telemetry data generated in response to a play of the first updated game by a first plurality of actual players;

generating, via the system, behavioral experience analysis (BEA) data based on the play of the first updated game by the first plurality of actual players;

generating, via the system, at least one BEA tool based on the BEA data;

updating the first updated gaming application, via the system, based on play of the first updated game by the at least one imitating game bot to generate a second updated gaming application corresponding to a second updated game;

generating predicted player motivations, via the system, based on second game telemetry data generated in response to a play of the second updated game by a second plurality of actual players; and updating the second updated gaming application, via the system, based on the predicted player motivations to generate a third updated gaming application corresponding to a third updated game.

2. The method of claim 1, wherein the imitating gaming bot includes an artificial neural network trained to imitate the actual players based on the first game telemetry data.

3. The method of claim 1, wherein the non-imitating gaming bot includes an artificial neural network trained based on at least one prior game.

4. The method of claim 1, wherein the non-imitating gaming bot includes an artificial neural network trained based on at least one prior version of the game.

5. The method of claim 1, wherein the BEA data includes motivation data that indicates a degree to which players are motivated by at least one of a plurality of motivation factors.

6. The method of claim 5, wherein the plurality of motivation factors includes at least one of: competence, autonomy, relatedness or presence.

7. The method of claim 5, wherein the plurality of motivation factors includes at least one of: competition, completion, fantasy, destruction, discovery, strategy, excitement or power.

8. The method of claim 5, wherein the plurality of motivation factors includes at least one of: high score, being constantly challenged, being challenged with some other frequency, reaching game goals and achievements, completing levels, relaxing, exploring, avoiding boredom, beating other players, spoiling other players games, cheating, avoiding other players that cheat or spoiling other players that cheat.

9. The method of claim 1, wherein the at least one BEA tool further predicts player experiences based on the second game telemetry data and updating the second updated gaming application is further based on the predicted player experiences.

10. The method of claim 1, wherein the processor executes a game development application stored in a non-transitory computer readable storage medium.

11. A method comprising:

receiving, via a machine including a processor and a non-transitory computer readable storage medium, a gaming application corresponding to a game;

updating the gaming application, via the machine, based on a play of the game by at least one non-imitating game bot to generate a first updated gaming application corresponding to a first updated game, wherein the at least one non-imitating game bot is executed via the machine via first operational instructions stored in the non-transitory computer readable storage medium, and wherein the at least one non-imitating game bot performs artificial intelligence (AI) simulated gameplay of the gaming application;

generating, via the machine, at least one imitating game bot based on first game telemetry data generated in response to a play of the first updated game by a first plurality of actual players, wherein the at least one imitating game bot is executed via the machine via second operational instructions stored in the non-transitory computer readable storage medium, and wherein the at least one non-imitating game bot performs AI simulated gameplay of the first updated gaming application;

generating, via the machine, behavioral experience analysis (BEA) data based on the play of the first updated game by the first plurality of actual players;

generating, via the machine, at least one BEA tool based on the BEA data;

updating the first updated gaming application, via the machine, based on play of the first updated game by the at least one imitating game bot to generate a second updated gaming application corresponding to a second updated game;

generating predicted player motivations, via the machine and utilizing the at least one BEA tool, based on second game telemetry data generated in response to a play of the second updated game by a second plurality of actual players; and updating the second updated gaming application, via the machine, based on the predicted player motivations to generate a third updated gaming application corresponding to a third updated game.

12. The method of claim 11, wherein the imitating gaming bot includes an artificial neural network trained to imitate the actual players based on the first game telemetry data.

13. The method of claim 11, wherein the non-imitating gaming bot includes an artificial neural network trained based on at least one prior game.

14. The method of claim 11, wherein the non-imitating gaming bot includes an artificial neural network trained based on at least one prior version of the game.

15. The method of claim 11, wherein the BEA data includes motivation data that indicates a degree to which players are motivated by at least one of a plurality of motivation factors.

16. The method of claim 15, wherein the plurality of motivation factors includes at least one of: competence, autonomy, relatedness or presence.

17. The method of claim 15, wherein the plurality of motivation factors includes at least one of: competition, completion, fantasy, destruction, discovery, strategy, excitement or power.

18. The method of claim 15, wherein the plurality of motivation factors includes at least one of: high score, being constantly challenged, being challenged with some other frequency, reaching game goals and achievements, completing levels, relaxing, exploring, avoiding boredom, beating other players, spoiling other players games, cheating, avoiding other players that cheat or spoiling other players that cheat.

19. The method of claim 11, wherein the at least one BEA tool further predicts player experiences based on the second game telemetry data and updating the second updated gaming application is further based on the predicted player experiences.

20. A game development platform comprising:
a machine that includes:
- a processing circuit; and
- a non-transitory computer readable storage medium configured to store a gaming application and further operational instructions that, when executed by the processing circuit, cause the processing circuit to perform operations that include:
- updating the gaming application, via the machine, based on a play of the game by at least one non-imitating game bot to generate a first updated gaming application corresponding to a first updated game, wherein the at least one non-imitating game bot is executed via the machine via first operational instructions stored in the non-transitory computer readable storage medium, and wherein the at least one non-imitating game bot performs artificial intelligence (AI) simulated gameplay of the gaming application;
- generating, via the machine, at least one imitating game bot based on first game telemetry data generated in response to a play of the first updated game by a first plurality of actual players, wherein the at least one imitating game bot is executed via the machine via second operational instructions stored in the non-transitory computer readable storage medium, and wherein the at least one non-imitating game bot performs AI simulated gameplay of the first updated gaming application;
- generating, via the machine, behavioral experience analysis (BEA) data based on the play of the first updated game by the first plurality of actual players;
- generating, via the machine, at least one BEA tool based on the BEA data;
- updating the first updated gaming application, via the machine, based on play of the first updated game by the at least one imitating game bot to generate a second updated gaming application corresponding to a second updated game;
- generating predicted player motivations, via the machine and utilizing the at least one BEA tool, based on second game telemetry data generated in response to a play of the second updated game by a second plurality of actual players; and
- updating the second updated gaming application, via the machine, based on the predicted player motivations to generate a third updated gaming application corresponding to a third updated game.

* * * * *